US006728365B1

(12) United States Patent
Li et al.

(10) Patent No.: US 6,728,365 B1
(45) Date of Patent: Apr. 27, 2004

(54) METHOD AND SYSTEM FOR PROVIDING QUALITY-OF-SERVICE ON PACKET-BASED WIRELESS CONNECTIONS

(75) Inventors: Xiao-Dong Li, Ottawa (CA); Chung-Ching Wang, Plano, TX (US); Kim Chang, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/464,592

(22) Filed: Dec. 16, 1999

Related U.S. Application Data
(60) Provisional application No. 60/153,749, filed on Sep. 13, 1999.

(51) Int. Cl.$^7$ .............................. H04Q 7/00; G06F 15/16
(52) U.S. Cl. .................... 379/329; 370/235; 370/356; 370/469; 709/232; 709/226; 709/229; 455/452.2; 455/561
(58) Field of Search ................................. 370/328, 338, 370/401, 349, 352, 356, 406, 235, 329, 469, 522, 524, 395.5; 709/232, 238, 246, 225, 226, 228, 229, 230; 455/452.2, 450, 426.1, 509, 561

(56) References Cited

U.S. PATENT DOCUMENTS

| | | | | |
|---|---|---|---|---|
| 5,903,735 A | * | 5/1999 | Kidder et al. | 370/468 |
| 6,353,616 B1 | * | 3/2002 | Elwalid et al. | 709/226 |
| 6,374,112 B1 | * | 4/2002 | Widegren et al. | 370/352 |
| 6,434,624 B1 | * | 8/2002 | Gai et al. | 709/232 |
| 6,452,915 B1 | * | 9/2002 | Jorgensen | 370/338 |
| 6,473,419 B1 | * | 10/2002 | Gray et al. | 370/349 |
| 6,487,170 B1 | * | 11/2002 | Chen et al. | 370/468 |
| 6,487,595 B1 | * | 11/2002 | Turunen et al. | 709/226 |
| 2001/0027490 A1 | * | 10/2001 | Fodor et al. | 709/238 |

OTHER PUBLICATIONS

Mahadevan et al., "An Architecture for QoS Guarantees and Routing in Wireless/Mobile Networks", Proceedings of the First ACM International Workshop on Wireless Multimedia, WOWMOM '98, pp. 11–20, 1998.*

Mahadevan et al., "An Experimental Architecture for Providing QoS Guarantees Mobile Networks Using RSVP", 9th IEEE International Symposium on Personal, Indoor and Mobile Radio Communications, vol. 1, pp. 50–54, Sep. 8–11, 1998.*

Terzis et al., "A Simple QoS Signaling Protocol for Mobile Hosts in the Integrated Services Internet", Proceedings of the 18th Annual Joint Conference of the IEEE Computer and Communications Societies, INFOCOM '99, vol. 3, pp. 1011–1018, Mar. 21–25, 1999.*

Chiruvolu et al., "Mobility and QoS Support for IPv6–Based Real–Time Wireless Internet Traffic", IEEE International Conference on Communications, ICC '99, vol. 1, pp. 334–338, Jun. 6–10, 1999.*

TR45 Medium Access Control (MAC) Standard for cdma2000 Spread Spectrum Systems, "cdma2000 Phase 1 MAC (IS–2000–3) Ballot Comment Resolution Text", MAC Ad Hoc Group, D.N. Knisely (Chair), c/o Lucent Technologies, Jul. 12, 1999, TIA.

* cited by examiner

Primary Examiner—Marsha D. Banks-Harold
Assistant Examiner—Rafael Perez-Gutierrez

(57) ABSTRACT

The invention provides methods and systems for extending RSVP signaling to wireless networks. RSVP messages may be intercepted by an RSVP daemon, adjusted as necessary to accommodate the wireless network, and then forwarded on as RSVP messages either on a traffic channel or as a short data burst. Alternatively, the RSVP messages may be encapsulated in layer 3 messages. Alternatively, RSVP messages may be intercepted by another component, such as a PDSN, which then coordinates the establishment of the requested wireless connection.

26 Claims, 16 Drawing Sheets

METHOD AND SYSTEM FOR PROVIDING QUALITY-OF-SERVICE ON PACKET-BASED WIRELESS CONNECTIONS

RELATED APPLICATION

This application claims the benefit of U.S. Provisional Application No. 60/153,749 filed Sep. 13, 1999.

FIELD OF THE INVENTION

The invention relates to methods and systems for providing quality-of-service on packet-based wireless connections.

BACKGROUND OF THE INVENTION

The Internet is evolving towards providing QoS (quality-of-service) capabilities, for example to satisfy the requirements of multimedia applications. Applications that demand QoS may signal the request explicitly through signaling protocols such as the Resource Reservation Protocol (RSVP) or through marking of certain fields of the IP header (e.g., the DS field). RSVP is used in Integrated Services (IntServ) to support end-to-end QoS commitment through the reservation of network resources along a data path. To obtain a desired level of QoS, the end applications make service requests using RSVP. These requests dictate the level of resources that have to be reserved across a multitude of networks to provide the desired QoS for the data flow. Each router along the data path has to apply admission control to requests to ensure that they are accepted only when there are sufficient local resources.

There are also draft proposals in IETF (Internet-Engineering Task Force) to support interoperation of RSVP/IntServ and DiffServ to provide end-to-end QoS delivery when a data flow traverses both networks of IntServ and DiffServ. Under the proposal, the edge nodes of DiffServ are capable of performing explicit admission control with respect to RSVP requests and of performing an IntServ-to-DiffServ service (QoS) mapping.

RSVP was originally designed to support QoS in the Integrated Services (IntServ) framework. Currently, only two QoS control services, Guaranteed Service and Controlled-Load Service have been formally specified for use with RSVP. Nevertheless, RSVP itself is separable from the IntServ framework and can be used as a general-purpose QoS signaling protocol for a variety of QoS control services with various setup mechanisms. All existing RSVP uses have been for wire line applications. The objects defined in RSVP can carry different information to meet different application and QoS control service requirements.

As wireless networks, and in particularly CDMA networks, evolve to support IP capabilities, they need an effective mechanism for QoS signaling over-the-air. It would be advantageous if CDMA networks could support the end-to-end QoS signaling adopted by the wire line IP networks.

In wire line applications, IP layer signaling plays a key role in configuring successful end-to-end QoS delivery. The existing cdma2000 signaling only allows the establishment of a service configuration between the mobile terminal and the radio access network. There is no support for end-to-end signaling for explicit QoS negotiation required by applications from both ends. There is a need for a mechanism to interpret and process IP layer (or other layer 3) signaling messages in a cdma2000 context.

SUMMARY OF THE INVENTION

It is an object of the invention to obviate or mitigate one or more of the above-identified disadvantages.

Various aspects of the invention provides a method, a base station and a wireless station, all adapted to allow a wire line QoS signaling schema to be applied to wireless applications, thereby facilitating an end-to-end QoS solution for connections including wireless links or at least facilitating a QoS solution from the wireless terminal to wherever the QoS solution might end within the wireline network.

In one aspect, the wire line QoS signaling schema employed is RSVP. In this aspect, the invention provides a method of extending RSVP QoS signaling to a wireless network by intercepting a PATH message to/from a mobile terminal served by the wireless network, modifying its contents to reflect constraints of the wireless network and forwarding the PATH message; intercepting a RESV message received in response to the PATH message; after intercepting the RESV message, in sequence: performing a QoS mapping from a RSVP QoS specified in the RESV message to wireless network parameters, checking if an existing wireless traffic channel satisfies the wireless network parameters and if not coordinating the establishment of a wireless traffic channel which satisfies the wireless network parameters, and forwarding the RESV message.

Thus, the RSVP messages themselves are used to perform the signaling or the wireless connection, but their parameters are changed to reflect constraints introduced by the wireless connection. Furthermore, preferably, only after the wireless connection is actually established is the RESV message forwarded. This solution can be applied to both mobile-originated and mobile terminated RSVP requests.

When a traffic channel is in existence, the RSVP messages can be sent over the existing traffic channel. After the QoS mapping has been performed, if the existing traffic channel cannot satisfy the resulting wireless parameters, a new service negotiation takes place to establish a traffic channel which has the required parameters.

When a traffic channel has not been yet established, some messages such as the PATH message may be sent with a short data burst service if one is available thereby eliminating the need to perform two traffic channel setups for the case where the initially setup traffic channel would not meet the QoS, instead only requiring a single traffic channel setup to be performed to setup a traffic channel with the required characteristics.

The above described embodiments have focussed on RSVP applications. More generally, the invention can be applied to any wire line QoS signaling schema. An embodiment provides a method of extending a wire line QoS signaling schema featuring QoS messages to a wireless network consisting of intercepting all QoS messages addressed to or received from a mobile terminal served by the wireless network, at least one of the QoS messages specifying a wire line QoS in accordance with the wire line QoS signaling schema, modifying contents of the QoS messages to reflect constraints of the wireless network, forwarding the QoS messages thus modified subject to the constraint that any message confirming the establishment of a connection between the mobile terminal and the wireless network is not forwarded until after performing a QoS mapping from a wire line QoS specified in the messages to wireless network parameters, checking if an existing wireless traffic channel satisfies the wireless network parameters and if not coordinating the establishment of a wireless traffic channel which satisfies the wireless network parameters.

Another broad aspect of the invention provides a radio network component or combination of components adapted to provide the required QoS mechanism. This might for example be implemented in a base station. The component (s) are adapted to include an RSVP daemon for intercepting RSVP messages, a QoS signaling adaptation module for mapping RSVP QoS to wireless parameters, for modifying RSVP messages to reflect wireless constraints, and for releasing RSVP messages to be forwarded after they have been modified subject to the constraint that any message confirming a connection to a mobile terminal having a particular RSVP QoS is not sent until a wireless connection having wireless parameters sufficient to at least meet the RSVP QoS has been established or verified to exist, and a QoS signaling adaptation control module for requesting a wireless connection based on the wireless parameters.

Other embodiments feature the use of layer 3 cdma2000 messages to encapsulate RSVP messages.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
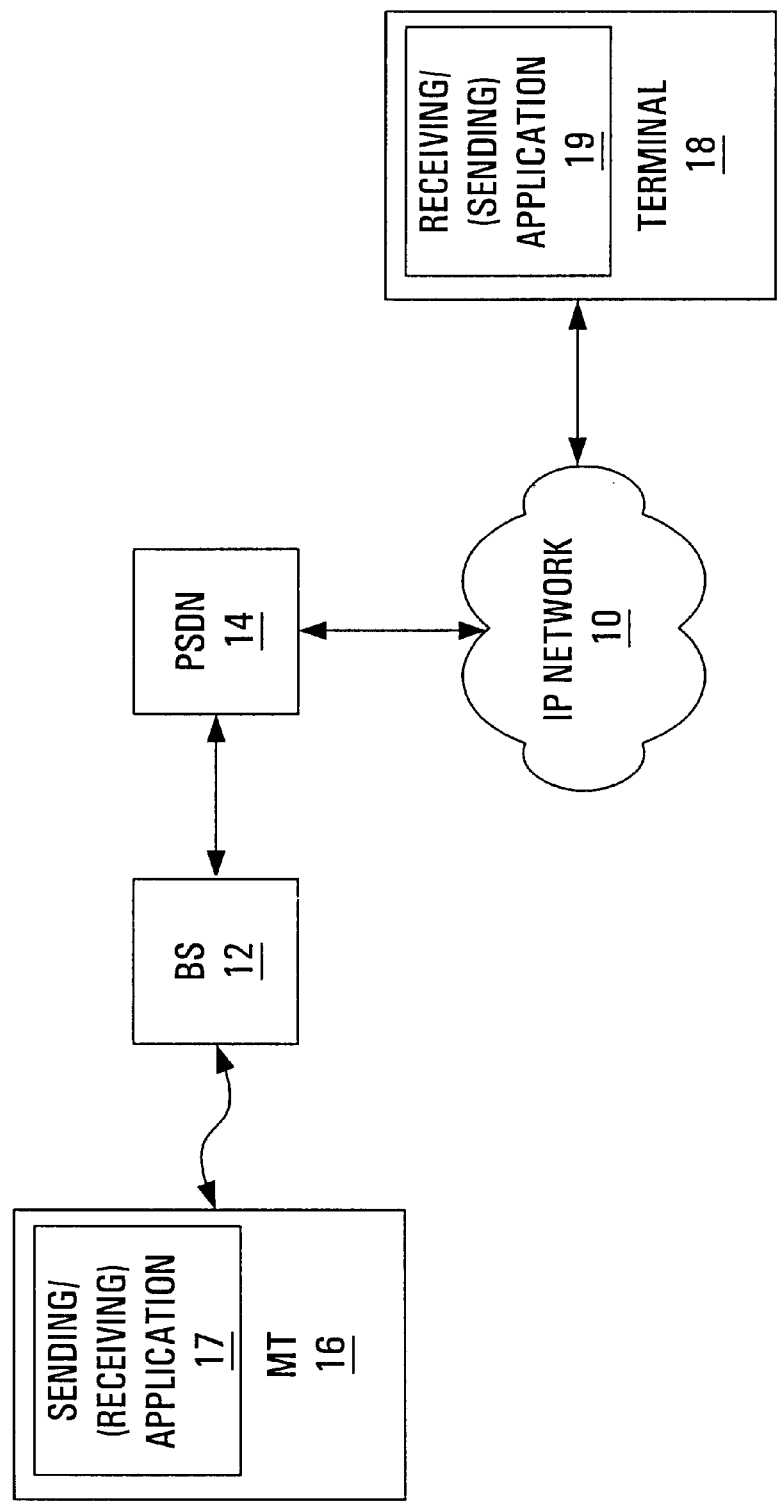
FIG. 1 is a block diagram of a simple network in which the methods and systems provided by embodiments of the invention may be applied.

By way of introduction, a brief general description of RSVP as it is applied in wire line applications will be provided.

RSVP plays two primary roles when QoS guarantees are explicitly requested by end applications for specific connections:

1) Allow end-to-end reservation of resources during a connection setup; and
2) Provide information needed to manage the use of QoS services during a communication session.

Three key objects are used in RSVP to permit communication of QoS parameters and to invoke QoS control services:

1) SENDER_TSPEC—generated by the sender and carries the traffic description of the sender. It is delivered unchanged across the network to the receiving application;
2) ADSPEC—generated either at the sender or the intermediate network elements, and carries information about the data path, the availability of certain QoS control services, and the parameters required by the specific QoS control services. ADSPEC may be used and updated by intermediate network elements. It provides the information needed by receivers to choose a service and determine the reservation parameters;
3) FLOWSPEC—generated by the receiver and carries the reservation request. It contains RECEIVER_TSPEC and RSPEC. RECEIVER_TSPEC provides a description of the receiver's traffic flow, while RSPEC defines the QoS parameters for the purpose of resource reservation.

Two primary messages are used for the setup of RSVP sessions: the PATH message and the RESV message. The PATH message originates from the traffic sender, whereas the RESV message originates from the traffic receiver. When a sender's application needs to initiate an RSVP session, it sends a PATH message to the receiver. The PATH message contains the SENDER_TSPEC describing the application traffic, and the ADSPEC specifying the QoS control capabilities and requirements of the application. The ADSPEC may be modified and updated by subsequent network elements before the PATH message arrives at the receiver.

The reservation process is receiver-oriented in that the receiver will initiate reservation upon receiving a PATH message from the sender. At the receiver, the associated application interprets the data in the SENDER_TSPEC and ADSPEC and determines the resource reservation parameters. These resource reservation parameters typically include:

1) The QoS control service desired, for instance, Guaranteed service or Controlled-Load service if IntServ is used;
2) The traffic descriptor, TSPEC, defining the level of traffic; and
3) The RSPEC describing the level of service required.

The above parameters are stored in the FLOWSPEC of the RESV message and sent to the sender along the same path used by the PATH message. Upon arrival of the RESV message at each RSVP-aware network element, the FLOWSPEC and the SENDER_TSPEC are used by the network element to make an appropriate resource reservation for the desired QoS control service. Reservation parameters of selected RESV messages may be merged at the intermediate nodes and a reservation is made for the merged request.

In determining the necessary resource allocation for a specific request, the network element (i.e., the router) must consider the QoS capability of the link layer. The IP layer needs to negotiate with the link layer to ensure that the link layer installs appropriate QoS support for the request. This includes a service mapping and adaptation process between the IP layer and the link layer. The mechanism for service mapping is medium-dependent.

Admission control is applied to a request according to the availability of local resources. Once appropriate resources are reserved along the data path, an end-to-end QoS commitment is made to allow the data flow to receive the desired QoS.

RSVP Message Formats

PATH Messages. Each PATH message contains the following information:

PHOP—the IP address of the last RSVP-capable node;

Sender_Template—the identifier of the sender, i.e., the IP address of the sender;

Sender_Tspec—the traffic descriptor of the sender.

The Sender_Tspec contains a set of parameters that defines the data flow based on a fluid model. These parameters include:

p=peak rate of flow (bytes/s)

b=bucket depth (bytes)

r=token bucket rate m=minimum policed unit (bytes)

M=maximum data size

A flow conforming to a token bucket rate of r and depth of b will have a delay bound of b/R when a bandwidth of R is allocated between the sender and the receiver.

ADSPEC—the information about service characterization parameters and the QoS capabilities along the path. It is updated by each RSVP-capable node. The ADSPEC contains a Default General Parameters fragment, and one or more service specific fragments, for instance, the Guaranteed Service fragment or the Controlled-Load Service fragment. The absence of a particular service fragment indicates that the omitted service is not supported. The Default General Parameters fragment contains the following fields:

Global break bit—The bit will be set when a router does not support RSVP.

IS hop count—The number of IntServ capable routers along the path.

Path bandwidth estimate—minimum bandwidth of the path.

Minimum path latency—the end-to-end path latency without queuing delay.

Path MTU—path maximum transmission unit.

Each intermediate RSVP-capable router intercepts the PATH message, updates the ADSPEC and installs or updates a path state entry for the sender. The path state installed at each router has a cleanup timer that provides the basis for the so-called RSVP soft-state mechanism. A refresh PATH message for the path state entry has to be received by the router at least once before the cleanup timeout to prevent tearing down the path state.

RESV Messages. A RESV message includes the following:

Reservation style—used to determine how reservation requests may be merged.

FILTERSPEC—used to identify the sender, and has the same format as the SENDER_TEMPLATE in a PATH message.

FLOWSPEC—comprising a service number (2 for Guaranteed Service, 5 for Controlled-Load Service), the TSPEC and the RSPEC if Guaranteed Service is desired. The TSPEC defines the traffic parameters of the receiver's desired reservation and has a format identical to the SENDER_TSPEC. The RSPEC contains two fields:

R—the bandwidth to be reserved;

Slack Term—allowed deviation from delay guarantee.

When creating a reservation specification, the receiver extracts the following parameters from the received PATH message:

p, b, r, m from the SENDER_TSPEC;

path bandwidth, minimum path latency, path MTU, and other service-specific parameters from the ADSPEC.

Using the above parameters, the receiver then calculates the minimum value of R and the Slack Term to satisfy the end-to-end delay bound required by the receiver's application for a guaranteed service. The resultant values are used to create a RESV message.

An embodiment of the invention provides, an RSVP-based QoS signaling approach for cdma2000 to achieve desired levels of QoS from end to end, or at least for the wireless portion of a connection.

A simple network which will be used by way of example for this description is depicted in FIG. 1.

FIG. 1 shows the IP Network 10 (more generally any data network) connected to a BS (base station) 12 through a PDSN (packet data servicing node) 14 (and typically through a base station transceiver, not shown). The BS 12 provides wireless connectivity (preferably cdma2000) to a mobile terminal such as MT (mobile terminal) 16. The MT 16, base station 12, and any other components forming part of the wireless communication system will be referred to collectively as the radio network. A second terminal 18 is shown connected to the IP Network 10. The MT 16 runs an application 17 which is either a sending or receiving application. Correspondingly, the second terminal 18 runs an application 19 which is either a receiving or sending application.

It is noted that the PDSN 14 is the anchor point between a cdma2000 radio network and the IP network 10. It is responsible for routing packets to or from the mobile terminal 16 based on a link layer association that it maintains between the PDSN 14 and the radio network. The PDSN 14 interacts with the radio networks to facilitate handoff from one to another. It also receives accounting information from the radio network and provides accounting information to an AAA (Authentication, Authorization, Accounting) server (not shown). Similar functional entities are specified in other wireless networks, such as in GPRS (General Packet Radio Service), however under a different name, SGSN (Serving GPRS Support Node).

Embodiments of the invention provide methods and systems for establishing and maintaining IP connections having a requested QoS involving mobile terminals. The invention will be described by way of example as it might be applied to the network of FIG. 1. For the purpose of this example, it is assumed that IP connections are to be established and maintained between the MT 16 and the second terminal 18 and more specifically between the two applications 17,19. The details of how this is achieved depend upon whether the request for the connection is made by the MT 16 in which case the MT's application 17 is the sending application and the second terminals application 19 is the receiving application or the second terminal 18 in which the sending and receiving roles are reversed, as will be described below.

According to the preferred implementation, the QoS scheme employed is in accordance with the RSVP protocol, and the approach taken to supporting RSVP signaling in cdma2000 is to make the radio network become RSVP-aware. The radio network intercepts the RSVP messages and acts according to their contents. The approach requires the radio network to be able to examine the header of IP packets in order to intercept the RSVP messages. This demands extra processing capability at the radio network because the current cdma2000 standard specifies a PPP connection between the radio network and the PDSN.

Specifically, the radio network is adapted to provide the following functions:

1) Intercept and interpret RSVP messages such as the PATH and RESV messages;

2) Map the traffic and QoS parameters carried in the PATH and RESV messages to the MAC (media access control) QoS parameters defined in cdma2000;

3) Update and pass on the PATH message, especially the ADSPEC according to the characteristics of the radio channel, and generate the RESV message based on wireless QoS commitment;

4) Implement an over-the-air signaling process to setup an appropriate service configuration between the mobile terminal (MT) and the base station (BS) to satisfy the required QoS guarantee; pass on the RESV message only when the required resources have been established.

Figure 2:
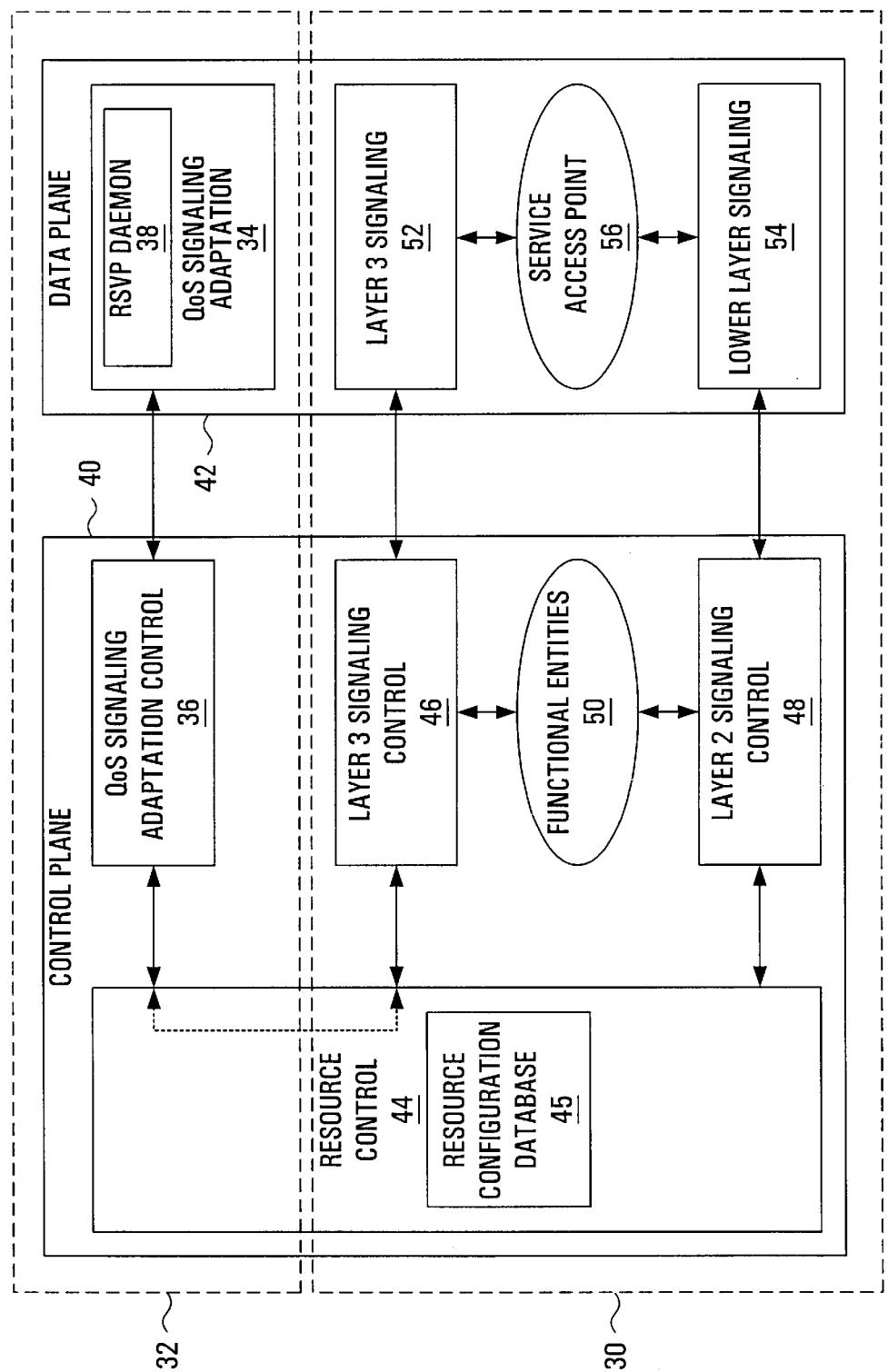
FIG. 2 is a signaling architecture for a base station according to an embodiment of the invention.

The above functionality is preferably provided with a new signaling architecture which will be described with reference to FIG. 2. The new architecture is based on the existing cdma2000 signaling layering model shown inside dotted box 30 with the addition of a QoS signaling adaptation layer shown inside dotted box 32.

The existing cdma2000 signaling model 30 is divided logically into a control plane 40 and a data plane 42. In the control plane, there is a RC (resource control entity) 44 which contains a resource configuration database 45 and which interacts with a layer 3 signaling control module 46 and a layer 2 signaling control module 48. Various functional entities 50 are available to the layer 2 and 3 signaling control modules 46,48. The layer 3 signaling control module 46 controls layer 3 signaling 52 performed in the data plane 42. Similarly the layer 2 signaling control module 48 controls lower layer signaling 54 performed in the data plane 42. The layer 3 signaling 52 interacts with the lower layer signaling 54 through the well known SAP (service access point) mechanism 56.

The QoS signaling adaptation layer 32 provides the capability of mapping IP QoS parameters defined in RSVP messages to wireless QoS parameters. This layer contains two entities: a QoS Signaling Adaptation (QSA) module 34 forming part of the data plane 42 and a QoS Signaling Adaptation Control (QSAC) module 36 forming part of the control plane 40. The QSA module 34 further contains an RSVP daemon 38 that intercepts and interprets RSVP messages as described in detail below. The QSA 34 maps IP QoS to MAC QoS using the results from the RSVP daemon 38.

The QSAC module 36 interacts with the RC entity 44 for the purposes of radio resource allocation and over-the-air service configuration signaling. The interface between the QSAC 36 and the RC entity 44 uses a set of primitives to allow the exchange of service request information. The QSAC 38 uses these primitives to request allocation or release of resources from the RC entity 44. Based on the parameters defined in these primitives the RC entity 44 instructs Layer 3 signaling to generate proper signaling messages for QoS negotiation and service configuration between the MT 16 and the BS 12.

QoS Signaling Adaptation Control to Resource Control Interface Primitives

The interface primitives between the QSAC 36 and RC entity 44 permit exchanges of control commands for resource allocation and release based on the requirements of RSVP messages. They in turn trigger the RC entity to instruct Layer 3 signaling to setup or tear down service connections accordingly. The following interface primitives, which preferably use the same convention defined or service interface primitives in cdma2000 standards for MAC, are defined:

Allocate is used to allocate resources from the RC. It consists of Allocate.Request and Allocate.Confirm. Allocate.Request is sent from the QSAC to the RC for requesting resources. It contains a list of resources desired. Allocate.Confirm is received by the QSAC from the RC. It contains a list of resources and a service reference ID.

Release is used to release resources. It includes Release.Request and Release.Confirm. Release.Request is received by the RC from the QSAC. It contains a list of resources that are to be released. Release.Confirm is received by the QSAC from the RC. It contains a list of resources that were released.

UpdateServiceInfo is used to indicate changes of service information (e.g., traffic type) to the RC, for instance when a new traffic type or service type has replaced the previous service.

The new interface primitives need to be added to the RC entity 44 for allocating, releasing radio resources according to the QoS request from the QSA.

MAC States

The mechanism provided by the invention to allow RSVP-based signaling is preferably dependent upon the MAC state of the MT 16. The MAC states include Active, Control Hold, Suspended, and Dormant. It is to be understood that other sets of states for the MT 16 may alternatively or additionally be considered.

Air Link Path for RSVP Messages

An air link path needs to be established for transmission of RSVP messages. When the MT 16 is powered up, it may go through several state transitions before a traffic channel is allocated, for example:

Mobile terminal Initialization State;

Mobile terminal Idle State;

System Access State; and

Mobile terminal Control on the Traffic Channel State.

Preferably, before the user launches the application 17, the MT 16 acquires a traffic channel in order to gain access to IP Network services through an ISP or an intranet service access point. At this access initialization stage, the QoS desired by the user application 17 is still unknown until the application is invoked and RSVP messages are generated. To provide an air link path for the RSVP messages, the MT 16 uses the "Origination Message" provided by cdma2000 to negotiate an initial service connection with the BS 12 based on a default set of service configuration parameters. These default parameters may be stored in the user profile in VLR/HLR (visitor location register/home location register). The RSVP messages are then carried over an initial traffic channel configured using the default parameters. Service re-negotiation may take place between the MT 16 and the BS 12 when warranted by the QoS specified in RSVP messages, and subsequently a new service configuration may be established.

When the MT 16 is registered with the radio network, but is in one of the MAC states other than the Active State (i.e., Control Hold State, Suspended State and Dormant State), a traffic channel reassignment is normally required to provide a path for RSVP messages. However, when the MT 16 is in the Dormant State, it may optionally use Short Data Bursts (SDB) for transmission of PATH messages before a traffic channel is reassigned by the BS 12. In the latter case, the traffic channel is reassigned by the BS 12 based on the resource requirements defined in the RESV message. This can potentially speed up service reestablishment and allow more efficient use of radio resources as the traffic channel is reassigned based on the actual QoS requirement.

Wireless-Aware QoS Signaling and Adaptation

The wireless link is characterized by high error rates when compared to wire line links. It is therefore necessary for the cdma2000 network to specify QoS parameters well suited for the wireless environment when supporting end-to-end QoS negotiations. For instance, the MTU (maximum transmission unit) of the wireless link should be kept small to allow efficient radio transmission, and-nodes along the data path should be aware of the wireless link delay when making resource reservations.

PATH Message Processing—The radio network, more specifically, the RSVP daemon 38 processes the PATH message and updates the ADSPEC according to the characteristics and capabilities of radio channels. The task includes updating the Default General Parameters fragment and other service specific parameter fragments such as Guaranteed Service and Controlled-Load Service.

The RSVP daemon 38 will update the following parameters in the Default General Parameters fragment:

Global break bit—Set this bit if cdma2000 does not support RSVP. A node that does not support RSVP needs to set this bit to inform the downstream nodes so that they know part of the link is not RSVP-capable, and may discard any subsequent information contained in the same PATH message.

IS hop count—Increment this counter if IntServ is supported by the radio network.

Path bandwidth estimate—Give an estimate of the minimum bandwidth that can be supported over the radio link based on call admission policy and radio resource capacity.

Minimum path latency—Provide an estimate of the radio link delay.

Path MTU—Specify the maximum transmission unit allowable for radio transmission.

By providing the above parameters based on the wireless characteristics, the radio network effectively makes the receiver and other RSVP-capable nodes aware of the requirements and limitations of the wireless link so that they can take these factors into consideration when making reservation decisions.

RESV Message Processing—In performing the QoS mapping, the QoS parameters specified in the RESV message are adapted to the wireless parameters used in the service negotiation and QoS assignment procedures. The invention preferably adds four new wireless QoS parameters to the existing service negotiation messages as defined in further detail below under the heading "Service Negotiation", namely:

Priority—used for call admission and data transmission scheduling, different priorities may be assigned for different services;

Min_Data_Rate—guaranteed minimum data rate over radio link;

Data_Loss_Rate—maximum data loss rate measured above the RLP layer; and

Max_Delay—maximum amount of time data can be held in the transmit queue.

RSVP is currently specified for Guaranteed Services and Controlled-load Services. However it may be used for other types of services that will emerge as the IP Network continues to evolve. Depending on the services to be supported, the mapping function from RSVP QoS to the above wireless QoS parameters may vary. For Guaranteed Services, the QoS mapping process is preferably as described below.

The RESV message contains two QoS parameters for Guaranteed Services: bandwidth R and slack term S. R is the bandwidth to be reserved in bytes/s, and the Slack Term is the allowed deviation from the delay guarantee (ms). A non-zero slack term offers the individual nodes flexibility in making local reservation. These two values are calculated by the receiver to satisfy the end-to-end delay bound determined by the application at the receiver. The QoS Signaling adaptation module 34 preferably performs the QoS mapping using the following procedures:

1. Assign Priority to the highest value for Guaranteed Services;
2. If S=0, calculate Min_Data_Rate to satisfy:
   Min_Data_Rate≧R+Link_Layer_Overhead else calculate Min_Data_Rate using the following equations:

$$S_{new}+b/R_{new}+C_{tot}/R_{new} \leq S+b/R+C_{tot}/R \quad \text{(Equation 1)}$$

$$R_{new} \geq r \quad \text{(Equation 2)}$$

$$\text{Min\_Data\_Rate} \geq R_{new}+\text{Link\_Layer\_Overhead} \quad \text{(Equation 3)}$$

where $S_{new}$ and $R_{new}$ are the modified reservation request produced by the QSA module 34. $S_{new}$ and $R_{new}$ are calculated from equation 1 and 2. There are more than one possible set of solutions for $R_{new}$ and $S_{new}$, the purpose is to find an $R_{new}$ that is smaller than the input R by consuming an amount of Slack S.

The slack term is used by the QSA 34 to adjust resource allocation by consuming an amount of permissible slack ($S-S_{new}$) so that it can admit service requests that would otherwise have been rejected due to insufficient bandwidth. $C_{tot}$ is the cumulative sum of error terms extracted from the ADSPEC, and b is the bucket depth defined in the TSPEC. Link_Layer_Overhead accounts for the overhead introduced by the radio link layer. The overhead comes from the link layer protocol when IP packets are segmented and reformatted into link layer frames. Headers and imperfect segmentations cause overhead. Also, signaling overhead for acquiring the traffic channel should be accounted for. Therefore, the bandwidth allocation has to take the overhead into consideration. The modified reservation request, i.e., the RESV message containing $S_{new}$ and $R_{new}$ will be forwarded to the next node.

3. If the QSA module 34 has knowledge about the application type, possibly by examining the TCP/IP header, assign Data_Loss_Rate to a value predefined for the application type;
   Else use a default value.
4. If p>R, Max_Delay≦(b−M)(p−R)/(R(p−r))+(M+$C_{tot}$)/R
   Else Max_Delay≦(M+$C_{tot}$)/R+$D_{tot}$
   Where p, b, r and M are defined in the TSPEC, $C_{tot}$ and $D_{tot}$ are the summation of error terms and extracted from the ADSPEC. R will be replaced with $R_{new}$ if the QSA modified the reservation request in step 2.

While the above provides a preferred QoS mapping for Guaranteed Service, it is to be understood that, within the scope of the invention, other mappings may alternatively be employed.

It is noted that the other currently defined service, namely Controlled-Load Service, does not use specific target values for QoS control such as delay and packet loss rate. By definition, Controlled-Load service implies a commitment by the network element to provide a service closely equivalent to lightly loaded best-effort traffic. This requires adequate allocation of capacity to the Controlled-Load flow. Statistical approaches based on measurement of past behavior may be used to determine long-term characteristics of the traffic, and to indicate whether or not capacity allocation is sufficient. As a minimal requirement, the Min_Data_Rate should satisfy:

Min_Data_Rate≧r+Link_Layer_Overhead,

Where r is the token rate specified in Tspec.

A priority value less than that for the Guaranteed Service and larger than that for best effort should be assigned for the Controlled-Load traffic.

Details of the signaling flows provided by embodiments of the invention will now be described with reference to FIGS. 3 to 10, in which mobile originated and mobile terminated signaling are treated separately, as are the cases which arise for different MAC states of the MT 16. In the figures and description which follows, both r-dtch and f-dtch are logical channels. dtch means Dedicated Traffic Channel, and is a logical channel used to carry user data traffic. r-dtch is the reverse link dedicated traffic channel and f-dtch is the forward link dedicated traffic channel. Furthermore, dmch stands for dedicated MAC channel. This is a logical channel used to carry Medium Access Control (MAC) messages. FCH (fundamental channel) and SCH (supplemental channel) are physical channels. A dtch can be mapped to either an FCH or an SCH. Finally, csch stands for common signaling channel. It is a forward or reverse logical channel used to carry user signaling data.

It is further noted that traffic activities in the MT 16 depend upon whether data services are to be provided on a fundamental channel (FCH) or supplemental channel (SCH). Either physical channel type can be used anywhere a traffic channel is used. The specific examples given below assume that traffic channel signaling is performed using the FCH. However, it is noted that in any of these cases the SCH may alternatively be used, and that this necessitates Supplemental Channel Request Message (SCRM) and Supplemental Channel Assignment Message (SCAM). For the SCH, before the MT 16 can send the RSVP message, either PATH or RESV, it has to send a SCRM to the BS 12, the BS 12 responds with SCAM. Before the BS 12 sends the RSVP messages, it first sends the SCAM.

Mobile Originated Signaling

When the MT 16 initiates an RSVP session by sending a PATH message, it triggers a series of signaling procedures between the MT 16 and the BS 12 to permit completion of the RSVP signaling process and to support necessary service negotiation to meet the requested QoS commitment. Signaling flows for different MAC states are described in the following subsections. The second terminal 18 for this case will be referred to as receiver 18.

Active State

Figure 3:
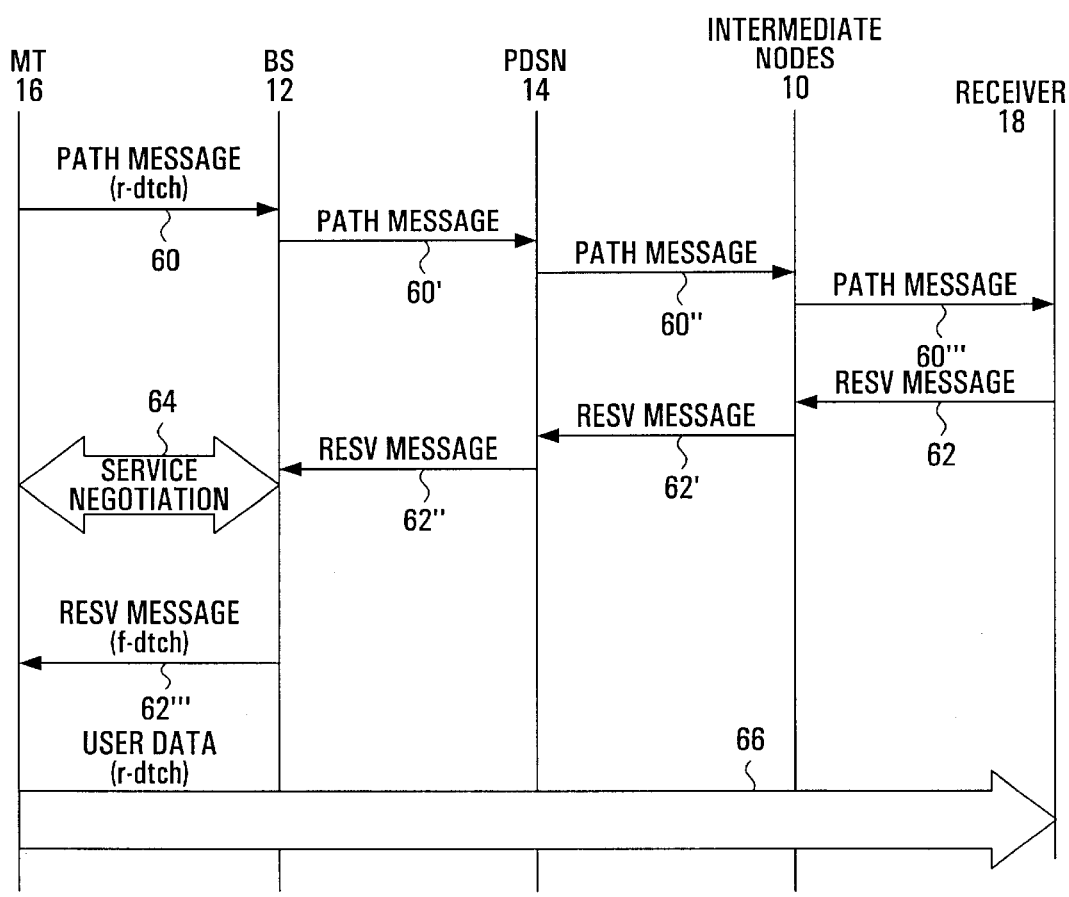
FIG. 3 is a signal flow diagram for mobile terminal originated RSVP signaling in the active state.

Referring to FIG. 3, which shows signal flows between the MT 16, BS 12, PDSN 14, the intermediate nodes represented by the IP Network 10, and the receiver 18 while in the Active State, a traffic channel is present and the PATH message 60 will be delivered over the traffic channel to the BS 12. Upon the arrival of the PATH message at the BS 12, the RSVP daemon 38 intercepts and updates the message as described above. The updated PATH message 60' is then passed on to the PDSN 14.

The PDSN 14 processes the PATH message 60' the same way as any RSVP-capable router and sends it to the next hop as message 60". Once the receiver 18 receives the final PATH message 60''', its application determines the appropriate QoS requirements based on the information contained in the SENDER_TSPEC and ADSPEC. Because the RSVP daemon 38 in the radio network has provided parameters that reflect the characteristics of the radio link, the receiver may take these wireless requirements into consideration and generates an RESV message 62 accordingly. As the RESV message 62 propagates back to the MT 16, each RSVP-capable node will make any necessary resource reservations that satisfy end-to-end QoS commitment.

Upon the arrival of the RESV message 62" at the BS 12, the RSVP daemon 38 processes the RESV message and the QSA module 34 maps the QoS parameters into appropriate MAC QoS parameters for example as described above for Guaranteed Services. The mapped parameters are compared to the existing service configuration of the current traffic channel. If the desired QoS can be met, an RESV message 62''' is sent over the air to the MT 16 and the RSVP setup is complete. Otherwise, a check is made to see if the requested QoS can be supported by the available resources. If not, then an $RESV_{err}$ message is sent to the MT 18, and this RSVP connection attempt fails. Assuming resources are available, the RESV message is withheld by the BS 12 and a service negotiation process indicated by 64 is initiated between the BS 12 and the MT 16. The following messages are used in the current cdma2000 standard for service negotiation between the BS 12 and the MT 16:

Service Request Message;
Service Response Message;
Service Connect Message;
Service Connection Completion Message;
Service Option Control Message; and
Supplemental Channel Assignment Message.

Further details of a preferred service negotiation process are provided below under the heading "Service Negotiations".

Upon completion of service negotiation 64, the RESV message 62''' is forwarded to the MT 16 over the air, and user data 66 exchange may begin.

The above process is also applicable to dynamic QoS re-negotiation when the mobile application's requirements have changed during a session and new reservations need to be made.

Control Hold State

In the Control Hold State, the dedicated traffic channel is released, however, the dmch channel remains active to permit fast reassignment of the traffic channel when the MT 16 becomes active. Request for transmission of data such as a PATH message by the mobile application triggers the reassignment of the traffic channel. Subsequently a transition from the Control Hold State to the Active State takes place. The PATH message is then sent to the BS 12 via the traffic channel and the signaling flow occurs as depicted in the Active State.

Suspended State

Figure 4:
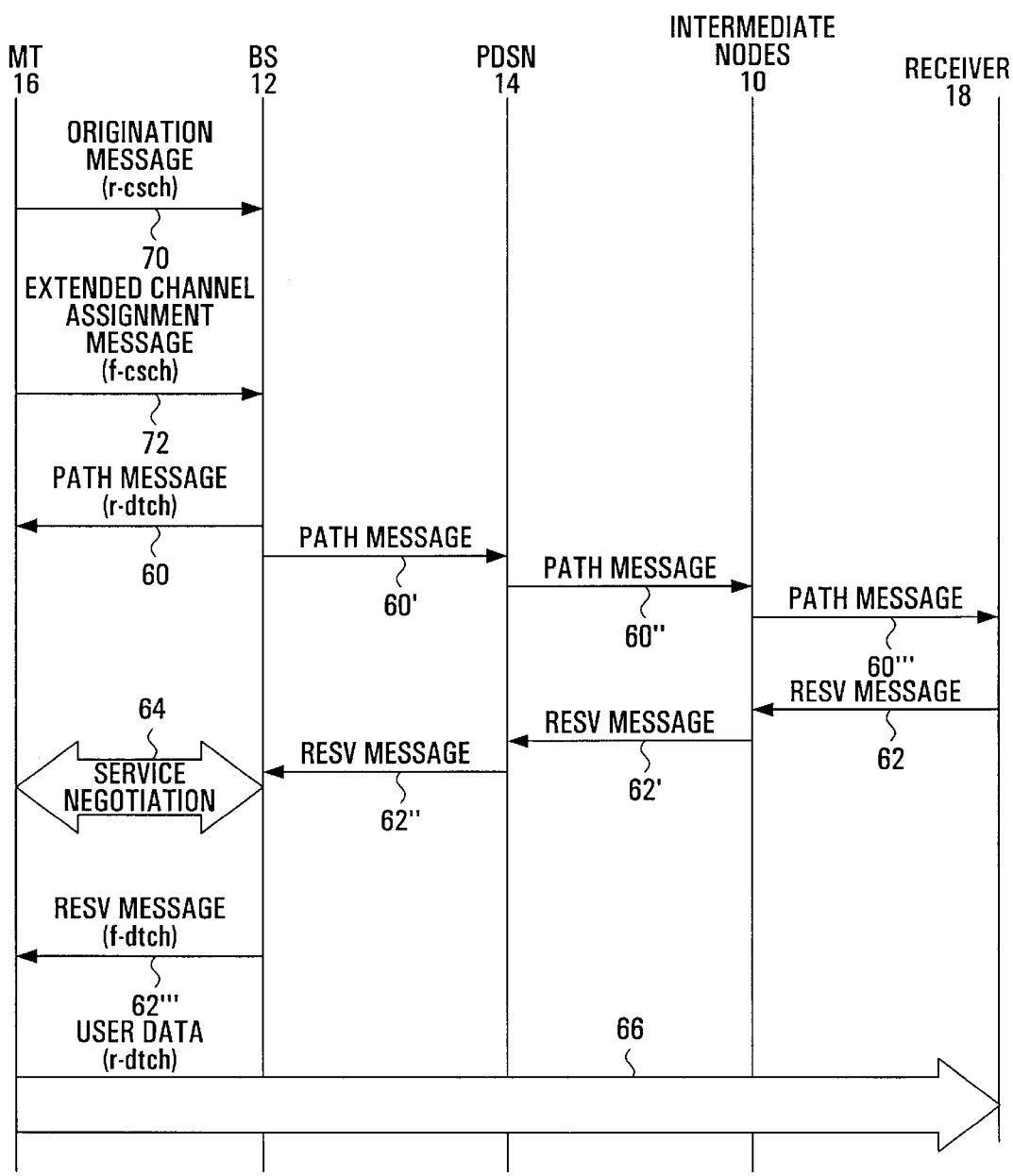
FIG. 4 is a signal flow diagram for mobile terminal originated RSVP signaling in the suspended state.

In this mode of operation, RLP state and service configuration information are maintained, also service options remain connected. FIG. 4 illustrates the signaling for the FCH, this leading to the exchange of an origination Message 70, and Extended Channel Assignment Message 72 between the MT 16 and the BS 12. Once a traffic channel is re-established and the MT 16 enters the Active State, the PATH message 60 will be sent to the BS 12 and the signaling flow repeats as shown in FIG. 3.

Dormant State

Figure 5:
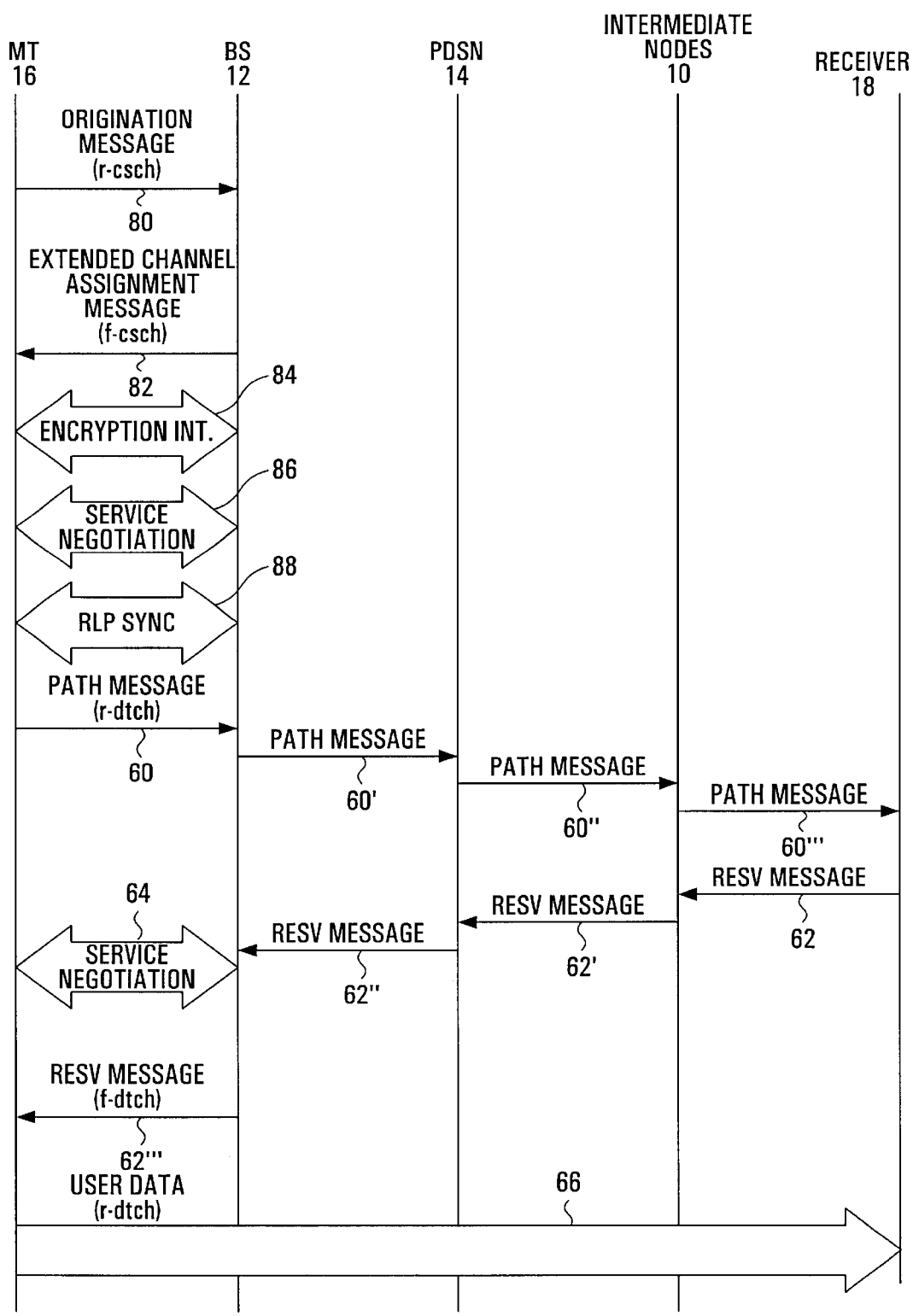
FIG. 5 is a signal flow diagram for mobile terminal originated RSVP signaling for the dormant state, first option.

In the Dormant State, the Service Option is disconnected. However, PPP remains open and the service configuration information is saved in the MT 16 and the BS 12. When sending the PATH message, the MT 16 transits out of the Dormant State to the Active State through re-establishment of the service connection, or alternatively remains in the Dormant State and sends the PATH message using SDB (short data burst). FIG. 5 illustrates the signaling process when the MT 16 transits from the Dormant State to the Active State before sending the PATH message. This involves the exchange of an origination message 80, an extended channel assignment message 82, encryption INT 84, service negotiation 86, and RLP sync 88.

Figure 6:
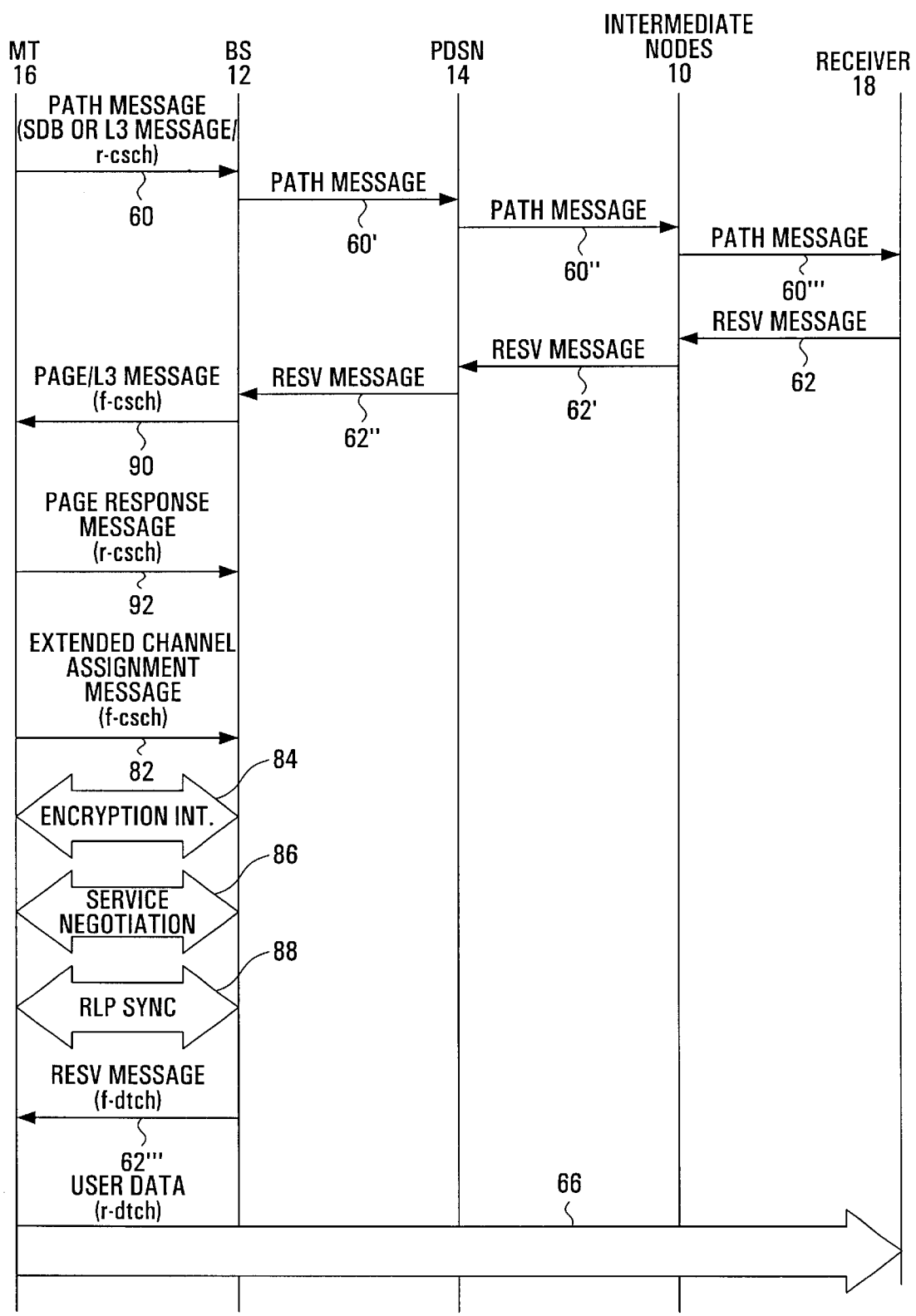
FIG. 6 is a signal flow diagram for mobile terminal originated RSVP signaling for the dormant state, second option.

FIG. 6 illustrates the signaling procedure through which the MT 16 sends the PATH message via SDB. Upon receiving the RESV message, the QSA 38 evaluates the QoS requirement and determines the appropriate service configuration. It then interacts with the RC 44 to initiate a service negotiation for the new requirement. A traffic channel is then set up at the instigation of the BS 12. This involves the exchange of a page message 90, page response message 92, followed by the above referenced extended channel assignment message 82, encryption INT 84, service negotiation 86, and RLP sync 88. Once the new service connection is successfully setup, the RESV message 62''' is sent to the MT 16 via the traffic channel. This second option enables faster and more efficient allocation of traffic channel resources than the first option especially when a new service connection is required.

Mobile Terminated Signaling

When the second terminal 18 (either another mobile terminal or a wire line host) initiates an RSVP session it becomes the sender and will be identified as such in the following description. It sends a PATH message to the MT 16. The MT 16 evaluates the request and sends an RESV message back to the sender 18. The signaling procedures for four different MAC states are described in the following subsections.

Active State

Figure 7:
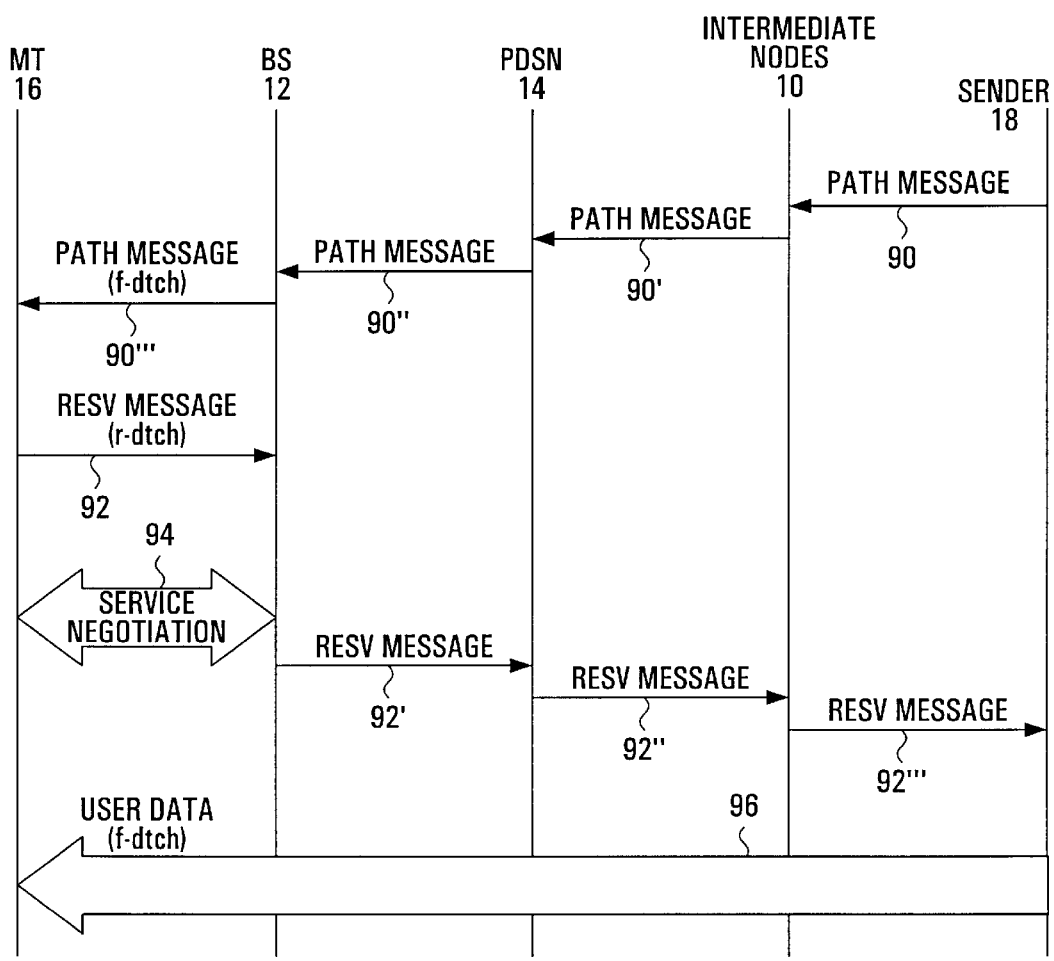
FIG. 7 is a signal flow diagram for mobile terminal terminated RSVP signaling for when the mobile terminal is in the active state.

The signaling flow for the active state is summarized in FIG. 7. When an initial PATH message 90'' from the sender 18 arrives at the BS 12, the RSVP daemon 38 processes the message as described above, then delivers it as message 90''' to the MT 16 via the traffic channel. The mobile application 17 determines the required resources and sends an RESV message 92 over the traffic channel to the BS 12 for eventual delivery to the sender 18.

The RSVP daemon 38 intercepts the RESV message 92 and interprets the QoS requirements from the RESV message 92 and adapts them into wireless QoS parameters. If the existing service configuration meets the QoS requirement, the BS 12 sends a RESV message 92' to the PDSN 14. Otherwise, a check is made to see if the requested QoS can be supported by the available resources. If not, then an RESVerr message is sent to the PDSN 14, and the RSVP connection attempt fails. Assuming resources are available, the BS 12 initiates a service negotiation process 94 with the MT 16 using the following signaling messages:

Service Request Message;
Service Response Message;
Service Connect Message;
Service Connection Completion Message;
Service Option Control Message; and
Supplemental Channel Assignment Message.

Once the BS 12 has successfully allocated the required radio resources, it sends the RESV message 92' to the PDSN 14. The RESV message 92' propagates through the intermediate nodes 10 towards the sender 18. When the sender 18 receives the final RESV message 92''' data transmission 96 can begin.

Control Hold State

Upon the arrival of a PATH message 90'' at the BS 12, the BS 12 reassigns the traffic channel for the MT 16. Subsequently a transition from the Control Hold State to the Active State takes place. The PATH message 90''' is then sent to the MT 16 via the traffic channel and the signaling flow occurs as depicted in the Active State.

Suspended State

Figure 8:
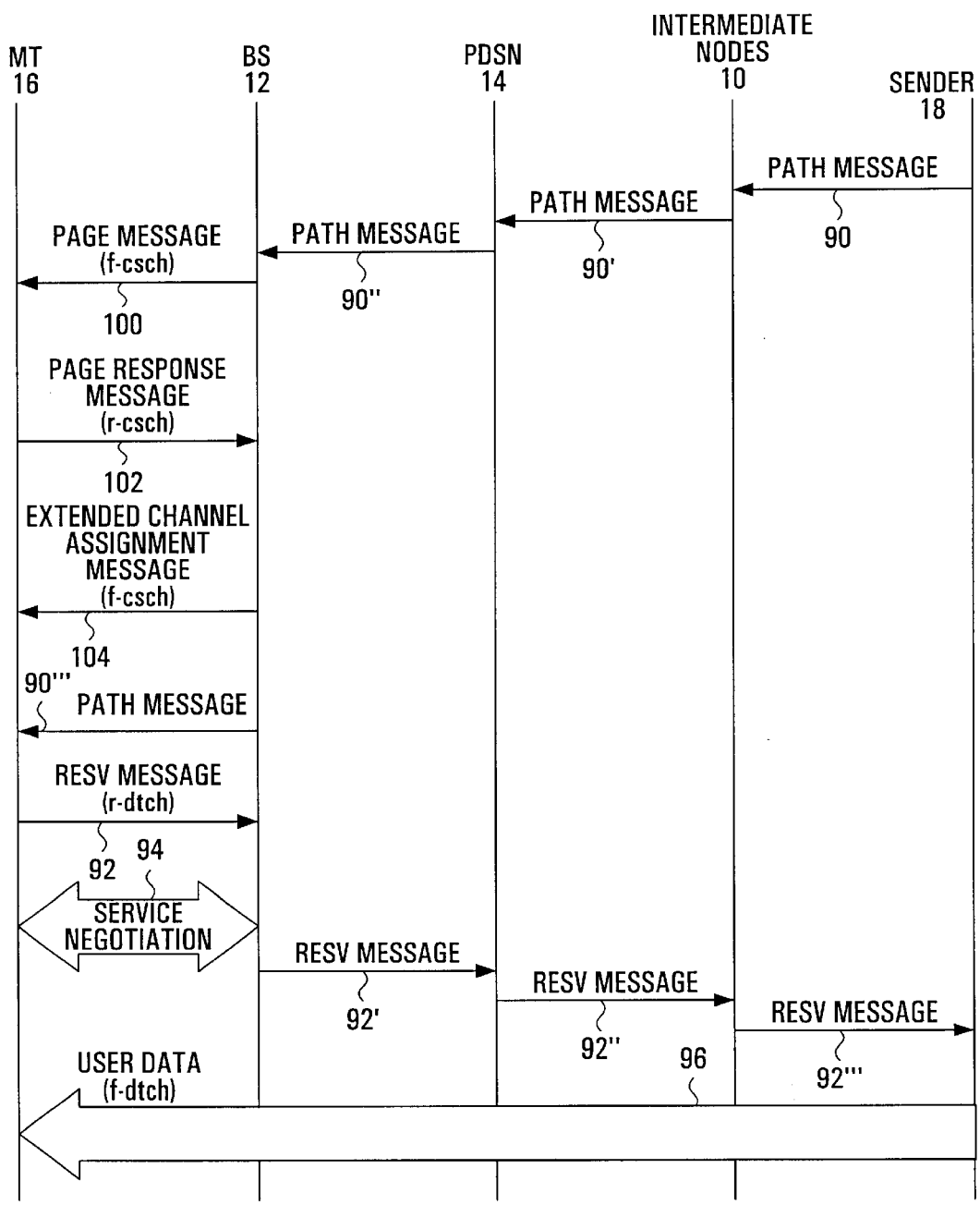
FIG. 8 is a signal flow diagram for mobile terminal terminated RSVP signaling for when the mobile is in a suspended state.

The signal flow for a mobile terminated connection when the MT 16 is in the suspended state is shown in FIG. 8. When receiving a PATH message 90'', the BS 12 signals to the MT 16 for traffic channel reassignment through the exchange of a page message 100, a page response message 102, and an extended channel assignment message 104. It then delivers the PATH message 90''' over the reassigned channel. The mobile application makes a reservation request by sending an RESV message 92 to the BS 12. The request is evaluated by the RSVP daemon 38 and the QSA module 34, and a decision is made on whether or not a new service configuration is needed and whether resources are available should a new service configuration be required. An $RESV_{err}$ message (not shown) is sent to the MT 16 should insufficient resources be available. A service negotiation 94 will take place between the MT 16 and the BS 12 if required. Following a successful service negotiation, radio resources are allocated and an RESV message 92' is forwarded to the PDSN 14 for subsequent setup processing.

Dormant State

Figure 9:
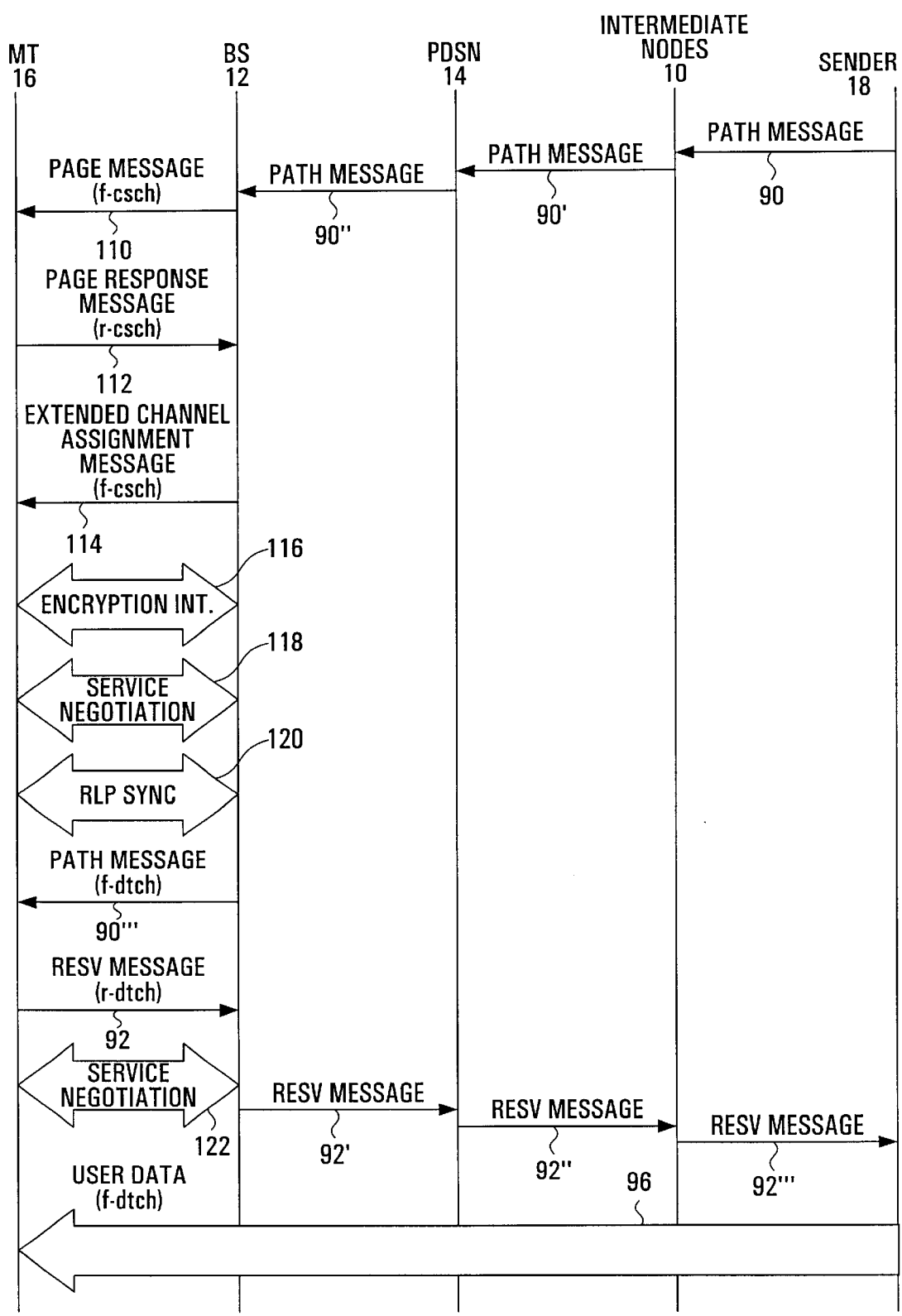
FIG. 9 is a signal flow diagram for mobile terminal terminated RSVP signaling for when the mobile terminal is in the dormant state, first option.

RSVP signaling for when the MT 16 is in the dormant state is shown in FIG. 9. While the MT 16 is in the Dormant State, the BS 12 first pages the MT 16 to restore the service connection through the exchange of a page message 110, a page response message 112, extended channel assignment message 114, encryption INT 116, service negotiation 118, RLP sync 120. Once a traffic channel is reassigned, the PATH message 90''' is sent to the MT 16 from the BS 12. After the MT 16 returns an RESV message 92 to the BS 12, the QSA 34 determines if a new service configuration is required to meet the requested QoS and determine if resources are available if a new service configuration is required. An RESVerr message (not shown) is sent to the MT 16 should insufficient resources be available. The BS 12 may initiate a service negotiation 122 with the MT 16 to allocate necessary resources. It then forwards an RESV message 92' to the PDSN 14.

Figure 10:
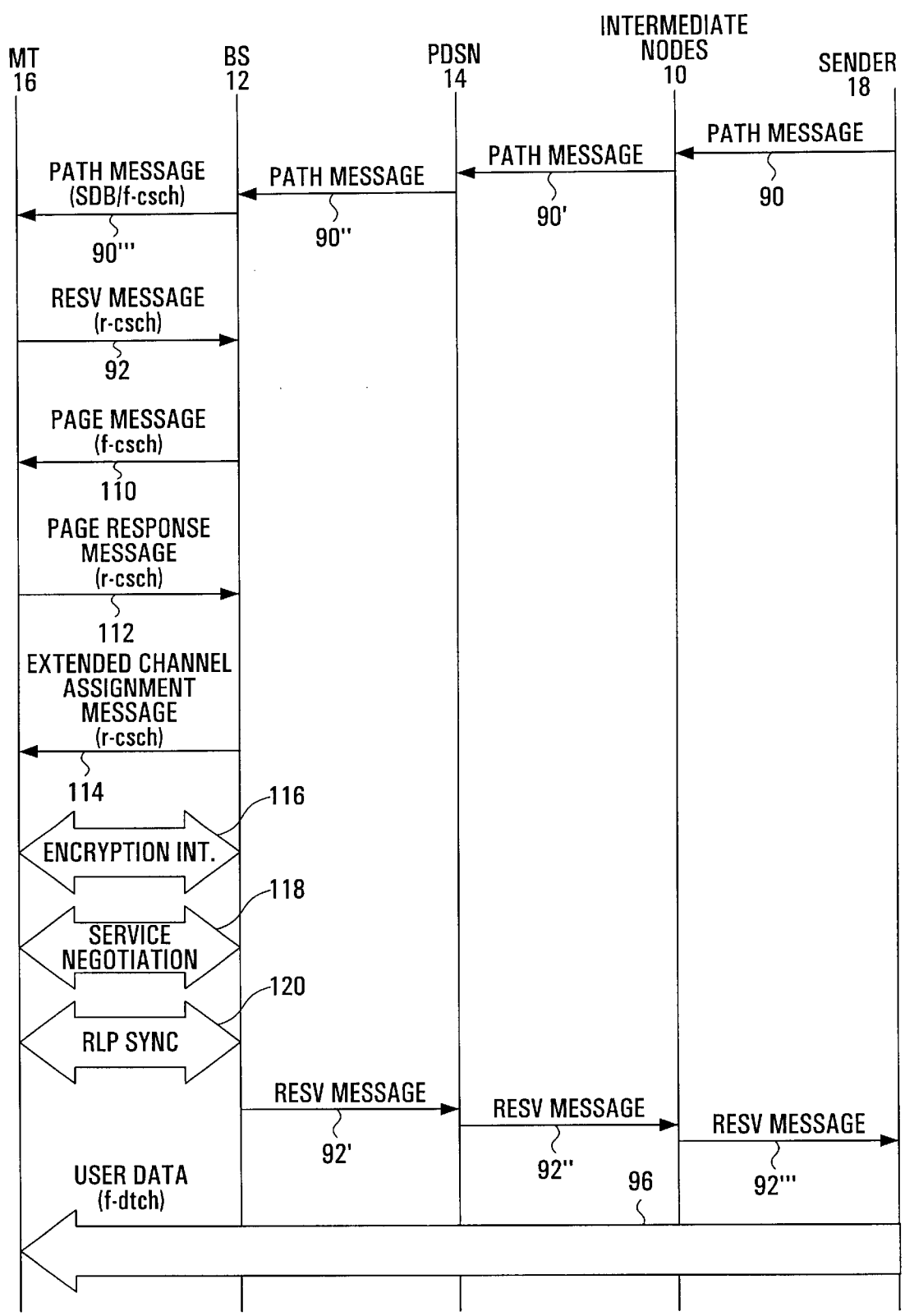
FIG. 10 is a signal flow diagram for mobile terminal terminated RSVP signaling for when the mobile terminal is in the dormant state, second option.

In a second option for dormant state signaling, as shown in FIG. 10, the BS 12 may decide to use SDB to send the PATH message 90''' to the MT 16, if it determines that the size of the PATH message permits the use of SDB. The MT 16 returns an RESV message 92 using SDB. The BS 12 allocates resources according to the QoS specified in the RESV message through the exchange of a page message 110, page response message 112, extended channel assignment message 114, encryption INT 116, service negotiation 118, and RLP sync 120. This option has an advantage over the first option, as the unwanted setup of a radio channel can be avoided, thereby facilitating the QoS signaling process and saving radio resources.

QoS for RSVP Messages in cdma2000

The QoS received by RSVP messaging per se is determined by the radio channels that carry them. Preferably, special QoS is provided to RSVP messages over the air and between the radio network and the PDSN 14.

Other Embodiments

In another embodiment, rather than making the radio network RSVP aware, the RSVP capability is implemented in the PDSN 14 and the PDSN 14 communicates the QoS requirements of RSVP to the radio network through a predefined interface. The radio network then initiates the appropriate over-the-air signalling procedures for service negotiation based on the parameters provided by the PDSN 14. This approach and the previously described approaches have their respective advantages and disadvantages. The previously described approach requires the radio network to be able to examine the header of IP packets to intercept the RSVP messages. This demands extra processing capability at the radio network because the current cdma2000standards specify a PPP connection between the radio network and the PDSN 14, terminating IP at the PDSN 14. On the other hand, the other approach does not require the radio network to be RSVP-aware and since the PDSN is capable of IP routing, therefore, installing RSVP processing capability in the PDSN 14 is easier than in the radio network. However, since the PDSN 14 does not possess any knowledge about radio resources, system load and channel conditions of the radio network, it cannot make call admission decisions or conduct over-the-air service negotiation with the MT 16. This requires the PDSN 14 to convey the QoS parameters carried in RSVP to the radio network through signalling messages. After the radio network makes the call admission decision and conducts service negotiation with the MT 16 based on the QoS requirements provided by the PDSN 14, it then has to feedback the result to the PDSN 14 via signalling messages. Using the feedback from the radio network, the PDSN 14 will then either forward the RSVP message to the radio network to complete end-to-end IP QoS setup, or generate an error message to indicate that the request is rejected by the radio network.

In yet another embodiment, the RSVP PATH Message and the RESV Message between the mobile terminal 16 and the base station 12 are transported by a specific cdma2000 Layer 3 message, rather than being in the form of IP data. One method to achieve this alternative is to encapsulate the RSVP messages in the cdma2000 Data Burst Message. This is to be contrasted from the previous embodiment in which the Short Data Burst service is used. Short Data Burst is a defined service carried on the Data Burst message medium. For this alternative embodiment, a new Data Burst message is defined (different from the defined Short Data Burst service). A new DATA_BURST_TYPE needs to be defined for carrying RSVP messages. Also, the Layer 2 MSG_LENGTH field needs to be expanded so that more than 256 bytes of information can be included in this message. Additional fields are added to the Data Burst Message to accommodate more CHARi fields, i.e., more user data. The following are exemplary changes to cdma layer 3 Data Burst Message which would facilitate this embodiment, the change being indicated in italics:

| Field | Length (bits) |
|---|---|
| MSG_NUMBER | 8 |
| BURST_TYPE | 6 |
| NUM_MSGS | 8 |
| NUM_FIELDS | 8 |
| NUM_FIELDS occurrences of the following field: | |
| CHARi | 8 |
| EXT_NUM_FIELDS | 16 |
| EXT_NUM_FIELDS occurrences of the following field: | |
| CHARi | 8 |
| EXT_NUM_FIELDS | Number of additional characters in this message. The mobile station sets this field to the additional number of CHARi fields included in this message. |
| CHARi | The field to encapsulate RSVP messages. The mobile station includes NUM_FIELDS occurrences of this field. The mobile station sets these fields to the corresponding octet of the data burst stream. |
| EXTENDED_BURST_TYPE (first two CHARi fields) | 16 |
| Remaining CHARi fields | 8 × (NUM_FIELDS − 2) |

Mobility Issues

Issues related to mobility arise when a mobile terminal moves between base stations. A new path needs to be setup when performing inter-subnet handoff. RSVP messages have to be generated to establish the new path and reserve resources along it. For intra-subnet handoff, the change of path may be transparent to the IP layer. In any case, coordination between the previous base station and the new base station is necessary to allocate and release resources and to install the corresponding state in the new base station.

Service Tear-down

Upon termination of the service, the sender will generate a PATHTEAR message to clear all downstream path state for that sender. Additionally, a RESVTEAR message exists to explicitly tear down reservation state. Receipt of either the PATHTEAR message or the RESVTEAR message by the RSVP daemon 38 in the wireless network leads to the release of radio resources assigned to the particular RSVP session. The QSAC 36 issues a release instruction to the RC 44 which in turn invokes the. necessary cdma2000 signaling procedures to release the associated radio channel assignment. The MT 16 then transits from the Active State to the Dormant State if no other data services are present. A service may also be torn down in the absence of refreshes for path state via PATH messages or for reservation state via RESV messages within the given cleanup timeout period.

Maintenance of path state and reservation state is part of the RSVP control mechanism. Both states are "soft" in that each state needs to be refreshed by Path and RESV messages periodically to keep alive. The use of soft state rather than hard state attributes to the requirement for maintaining the robustness of the IP network. When a route changes, the subsequent path message will install the Path State along the new routing path, and future RESV messages will establish reservation state. The state on the unused segment of route will time out. A "cleanup timer" is used by RSVP for state removal, while a "refresh timer" is used for state refresh. At the expiration of each "refresh timeout" period and after a state change, RSVP in each end node generates Path and RESV refresh messages and passes these on to succeeding hops. In the case with the wireless network, the RSVP entities in the RN and the PDSN also generate Path and RESV refresh messages at each refresh timeout period, and maintains a cleanup timer. The cleanup timer is reset upon receipt of a refresh message.

For service tear down due to timeout, preferably a mechanism based on the MAC state transition is employed. The MT 16 will transit from the Active State to the Control Hold State. Consequently the traffic channel is released from the MT 16. The dmch channel remains active to permit fast reassignment of the traffic channel when the service needs to be reconnected. Further inactivity of the MT 16 in the Control Hold State will cause the MT to transit to the Suspended State, then eventually to the Dormant State. More details about state transitions are given in the paragraph below for Maintaining QoS.

Maintaining QoS

In addition to reservation of resources during a connection setup, the BS 12 also must properly manage the MAC state transitions to maintain the QoS it has committed to. Cdma2000 has four MAC states for packet data services, namely, Active, Control Hold, Suspended and Dormant. To allow efficient use of radio resources, the MT 16 will make state transitions from Active, to Control Hold, to Suspended, and finally to Dormant after a period of inactivity in each state. When the MT 16 is not in the Active state, the traffic channel used by the MT 16 can be reassigned to other users. Arrival of traffic for the MT 16 causes it to re-enter the Active state from the other three states, and a traffic channel is reassigned to the MT 16.

Because the transition back to the Active state and reacquiring a traffic channel involves signaling overhead, additional delay is incurred. As a result, the BS 12 may not be able to meet the delay requirement. To solve this problem, the timeout timer for the MAC states is preferably adjusted during service configuration setup (i.e., service negotiation). The Active state timeout timer may be configured according to:

If the Slack Term $S<T_{transit}$, $T_{active}=T_{cleanup}$
Else begin
   if $T_{active\_default}<T_{cleanup}$
   $T_{active}=T_{active\_default}$, $T_{control\_hold}=T_{cleanup}$,
Else $T_{active}=T_{cleanup}$
   $S_{new}=S-T_{transit}$
End else Where S is the slack available to the wireless link. $T_{transit}$ is the time required for the MT 16 to transit from Control Hold to Active. $T_{active}$ is the inactive period permissible for the Active state (after which the MT moves to the Control Hold). Tcleanup is the minimum of cleanup timeout periods specified for RSVP path state and reservation state. $T_{active\_default}$ is the default value for $T_{active}$. Usually it is optimized for efficient radio resources utilization. $T_{control\_hold}$ is the inactive period permissible for the Control Hold state (after which the MT 16 moves to the Suspended state).

The above algorithm enables the BS 12 to determine whether or not the available slack term is adequate to compensate for the delay of $T_{transit}$ when MT 16 transits from Control Hold to Active. If the available slack is insufficient, the MT will not timeout from the Active State until the cleanup timer for path or reservation state expires. If the allowable slack is larger than $T_{transit}$, the MT 16 is allowed to transit to the Control Hold state after a period of inactivity. The wireless link consumes an amount of $T_{transit}$ from S. The new slack $S_{new}$ is then computed and included in the RESV message. The above process takes place before the BS 12 releases the RESV message.

MT Functionality

Figure 11A:
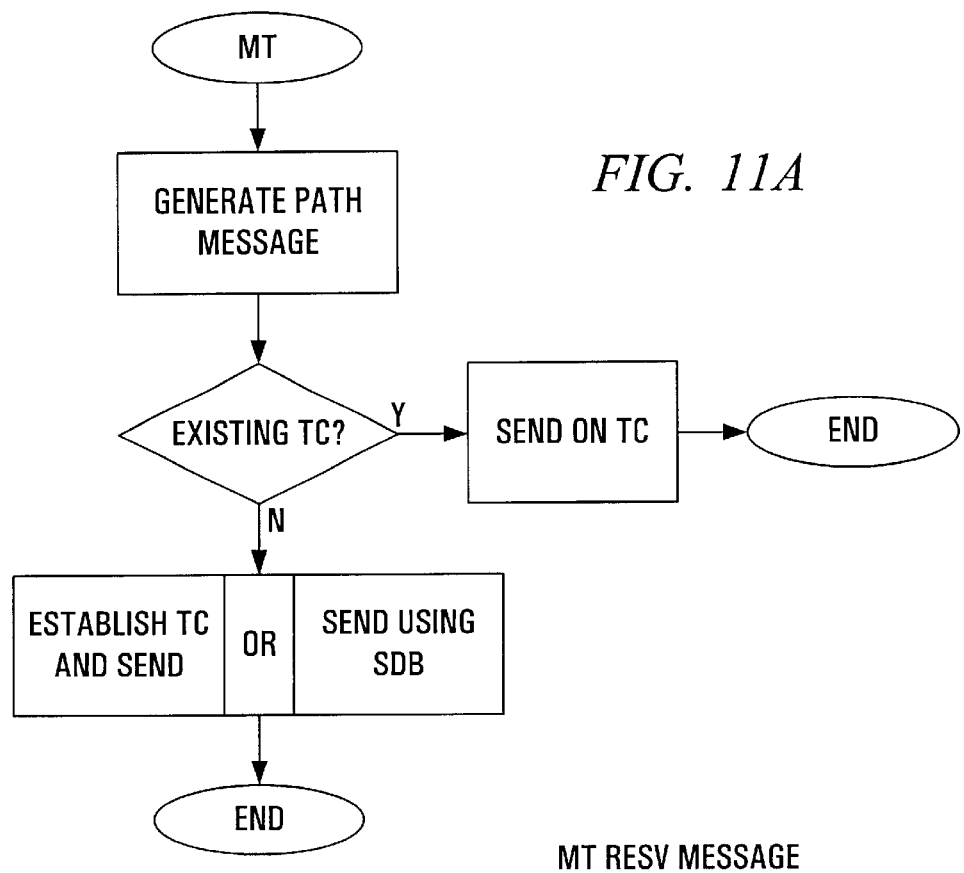
FIGS. 11A through 11D are flowcharts for examples of the behavior of the mobile terminal and the radio network for mobile terminal originated RSVP signaling.
Figure 11D:
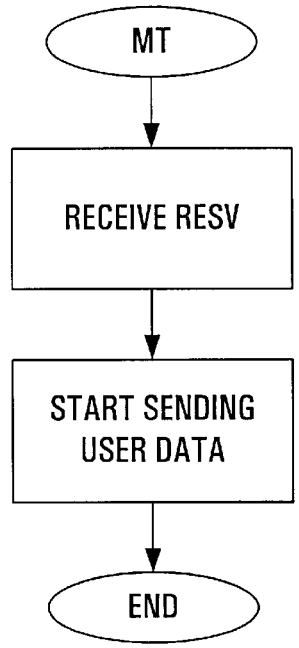

Exemplary functionality of the mobile terminal 16 in the event of mobile terminal originated RSVP signaling is illustrated in the flowcharts in FIGS. 11A and 11D. Referring firstly to FIG. 11A, the application running the mobile terminal 16 generates a path message in order to request an RSVP QoS. In the event that there is a traffic channel, the mobile terminal 16 sends the path message on the traffic channel to the base station 12. In the event that there is no existing traffic channel, either the mobile terminal 16 initiates the establishment of a traffic channel and sends the message on the traffic channel thus established, or alternatively the mobile terminal 16 sends the message using a short data burst service if available.

Sometime later, the mobile terminal 16 will receive the RESV message in return from the base station 12. As indicated in FIG. 11D, when the mobile terminal 16 receives the RESV message, it can begin sending user data.

The MT 16 needs to be RSVP aware only if 1) RSVP messages are encapsulated in cdma2000 layer 3 messages; 2) RSVP messages are sent via Short Data Burst services. Otherwise, only RSVP-capable application software is needed.

Figure 12A:
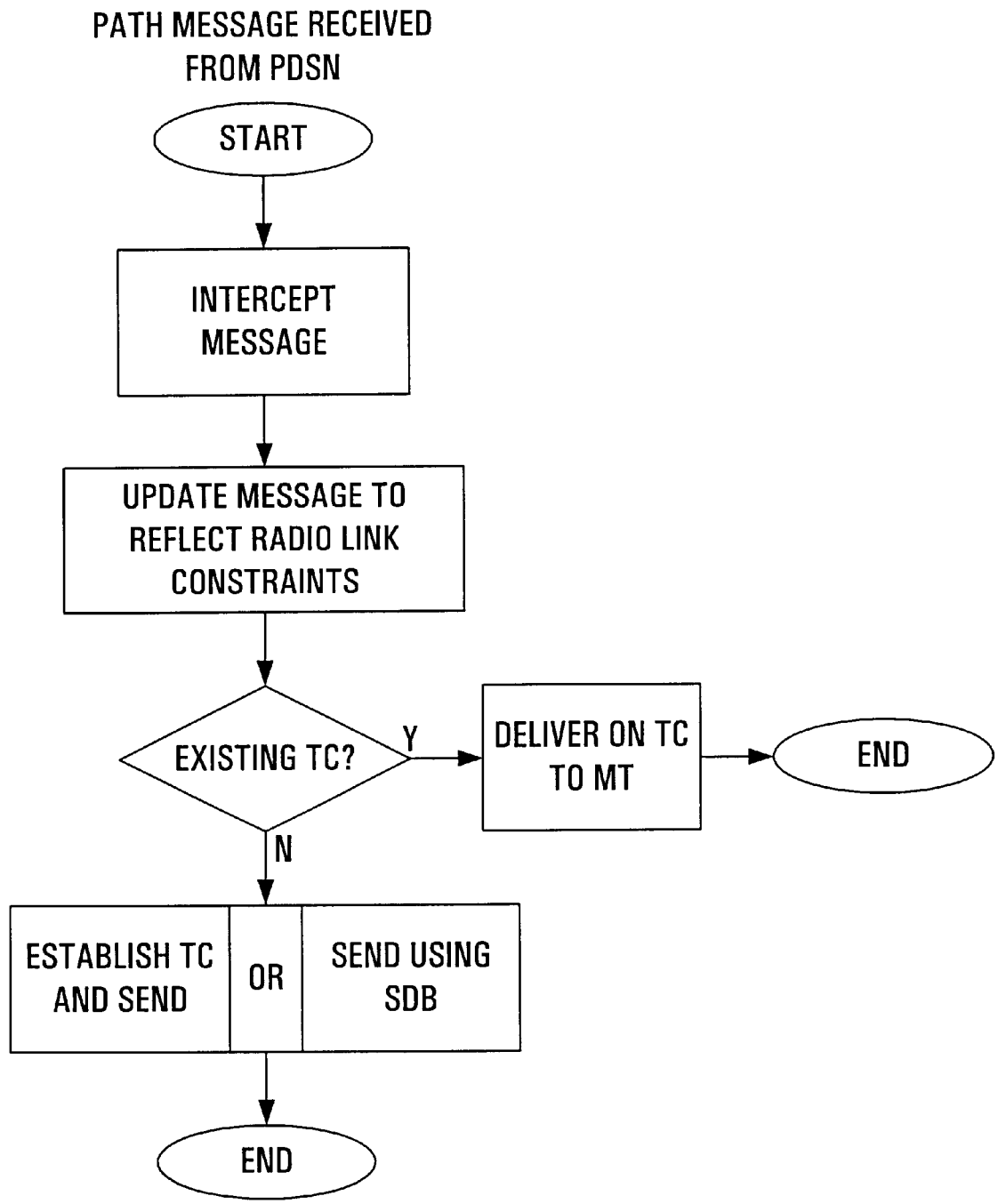
FIGS. 12A through 12C are flowcharts for examples of the behavior of the mobile terminal and the radio network to handle mobile terminal terminated RSVP signaling.
Figure 12B:
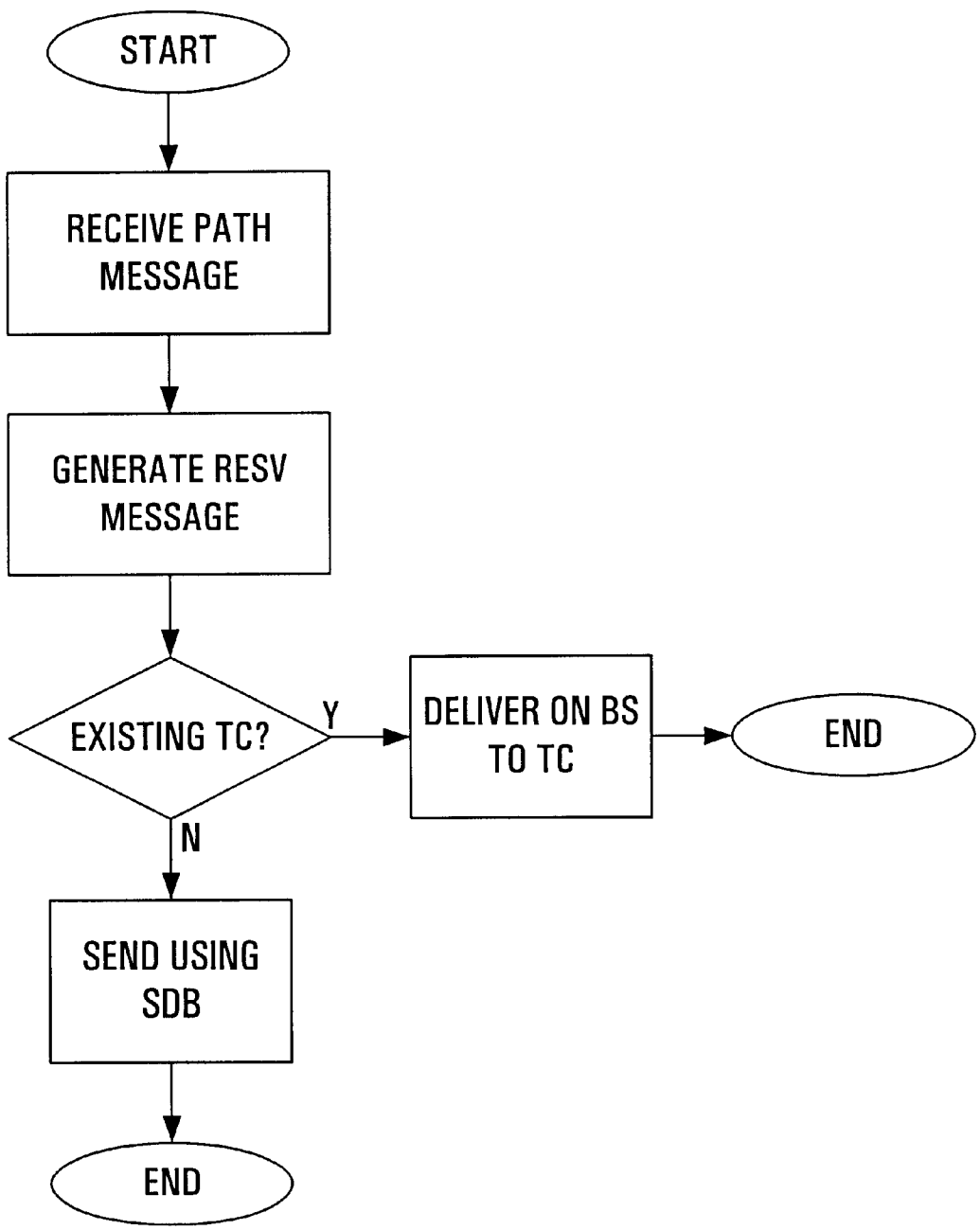

Exemplary functionality of the mobile terminal 16 in the event a mobile terminal terminated data flow is to be established is shown in the flowchart of FIG. 12B. To begin, the mobile terminal 16 receives the path message from the base station. The application then generates an RESV message and sends this back to the base station 12. The mobile terminal 16 is not responsible for assessing the QoS required or for establishing the channel at this time. In the event that there is an existing traffic channel, the RESV message is sent over this channel. Alternatively, the message may be sent using the short data burst service.

Radio Network Functionality

Figure 11B:
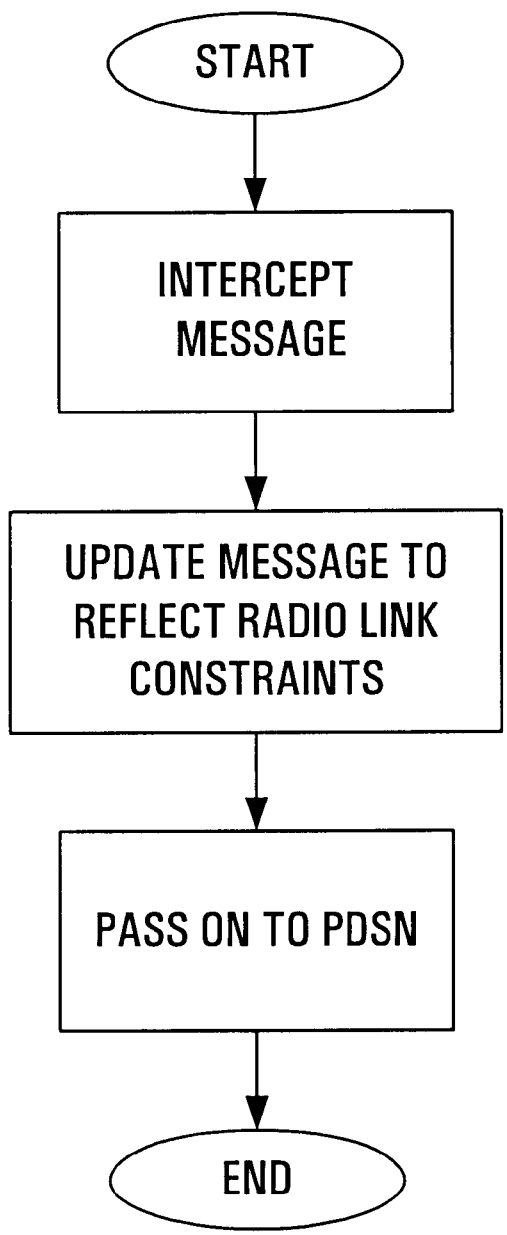

Exemplary radio network functionality for a mobile originated RSVP request will be described with reference to FIGS. 11B and 11C. While for the purpose of this example it is assumed that these functions are performed within the base station 12 communicating with the mobile terminal 16, more generally, these functions can be performed at any point or points within the network capable of intercepting the messages in the required manner and passing them to the PDSN 14 or receiving them from the PDSN 14. In FIG. 11B, the behavior after the radio network receives the path message from the mobile terminal 16 is shown. In our example it is assumed that the RSVP daemon 38 running on the base station 12 as part of the QoS signaling adaptation module 38 intercepts the path message. The path message is then updated to reflect the radio link constraints. Finally the path message is passed on to the PDSN 14.

Figure 11C:
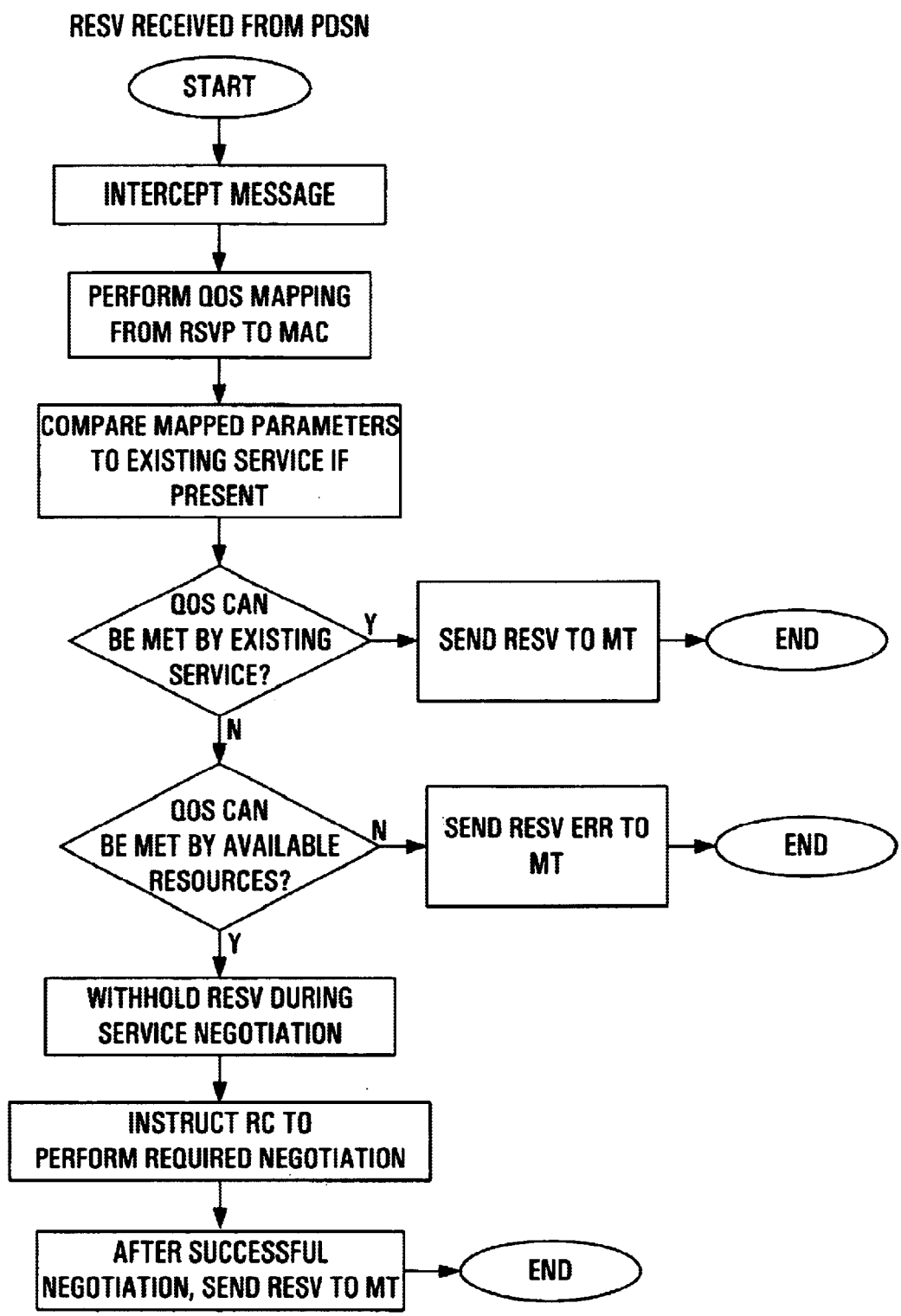

FIG. 11C is a flowchart for exemplary behavior of the radio network upon receipt of an RESV message from the PDSN 14. First the message is intercepted, preferably by the RSVP daemon 38. Next the QoS signaling adaptation module 34 performs a QoS mapping from the RSVP parameters to MAC layer parameters appropriate for the wireless connection. Next, assuming there is a traffic channel in existence, a comparison between the mapped parameters and the existing service is made. If the existing service can meet the required QoS, then no change in the traffic channel needs to be made, and the RESV message can be forwarded to the mobile terminal 16. Alternatively, the RESV message is withheld during service negotiation assuming resources are available. In the absence of sufficient resources, an $RESV_{err}$ message is sent to the PDSN 14. The QoS adaptation control module 34 instructs the resource control module 44 to perform the required negotiations to set up a traffic channel having the required characteristics to meet the QoS. After successful negotiation, the RESV message is forwarded to the mobile terminal 16.

Exemplary behavior of the radio network in the event that there is to be established a mobile terminal terminated connection will be described with reference to FIGS. 12A and 12C. FIG. 12A illustrates the behavior upon receipt of a path message from the PDSN 14. The RSVP daemon 38 intercepts this message and updates the message to reflect radio link constraints. Next, if there is an existing traffic channel the path message is delivered on to the mobile terminal 16 on this traffic channel. Alternatively, if there is no existing traffic channel, either a traffic channel can be established to send this message, or alternatively the message can be sent using the short data burst service if available.

Figure 12C:
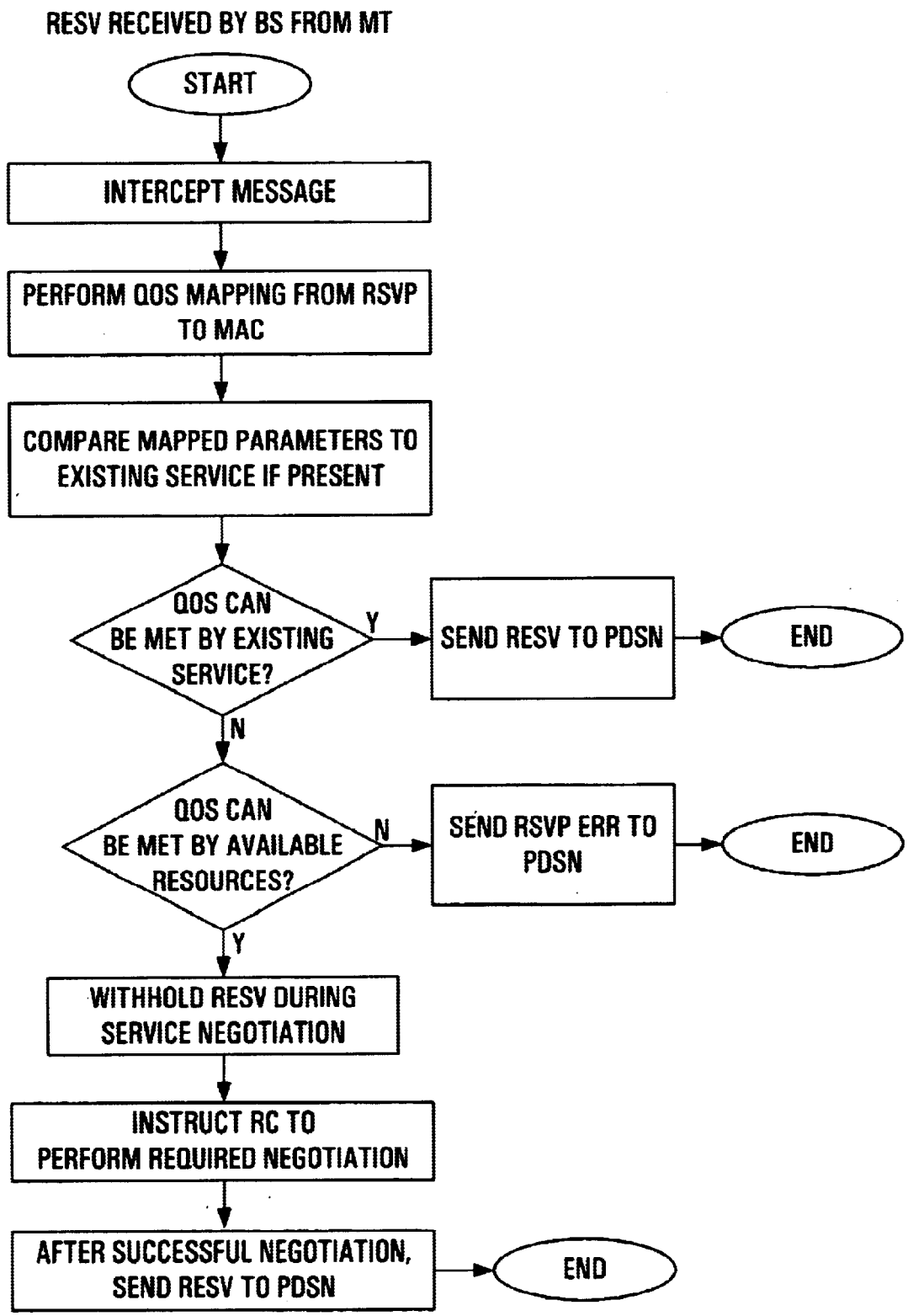

FIG. 12C illustrates exemplary behavior of the radio network upon receipt of an RESV message from the mobile terminal 16. First the RSVP daemon 38 intercepts the message. It next performs the same functionality described previously with respect to FIG. 11C, except that after either determining the existing traffic channel is acceptable or after negotiating a new traffic channel, the RESV message is sent to the PDSN 14 rather than the mobile terminal 16.

The above described embodiments have focussed on RSVP applications. More generally, the invention can be applied to any wire line QoS signaling schema. An embodiment provides a method of extending a wire line QoS signaling schema featuring QoS messages to a wireless network consisting of intercepting all QoS messages addressed to or received from a mobile terminal served by the wireless network, at least one of the QoS messages specifying a wire line QoS in accordance with the wire line QoS signaling schema, modifying contents of the QoS messages to reflect constraints of the wireless network, forwarding the QoS messages thus modified subject to the constraint that any message confirming the establishment of a connection between the mobile terminal and the wireless network is not forwarded until after performing a QoS mapping from a wire line QoS specified in the messages to wireless network parameters, checking if an existing wireless traffic channel satisfies the wireless network parameters and if not coordinating the establishment of a wireless traffic channel which satisfies the wireless network parameters.

In the above described embodiments, most of the functionality has been assumed to be implemented in the base station. More generally, it can be provided in any component or combination of components adapted to provide the required QoS mechanism. The component(s) are adapted to include an RSVP daemon for intercepting RSVP messages, a QoS signaling adaptation module for mapping RSVP QoS to wireless parameters, for modifying RSVP messages to reflect wireless constraints, and for releasing RSVP messages to be forwarded after they have been modified subject to the constraint that any message confirming a connection to a mobile terminal having a particular RSVP QoS is not sent until a wireless connection having wireless parameters sufficient to at least meet the RSVP QoS has been established or verified to exist, and a QoS signaling adaptation control module for requesting a wireless connection based on the wireless parameters.

The above described embodiments have dealt with providing QoS over a CDMA network, with particular application to cdma2000 networks. More generally, the methods and apparatuses are applicable to CDMA networks in accordance with any standard which will handle data connections, and more generally to wireless networks in general.

Service Negotiations

Details of service negotiation are generally well understood. However, additional fields and new QoS assignment messages are preferably added to the existing cdma2000 messages. Detailed example definitions are given below.

QoS Parameters Fields

The following parameter can be included in the FOR_QOS_BLOB for the Forward Channel (prefixed by FOR_), REV_QOS_BLOB Reverse Channel (prefixed by REV_), or both. BLOB is a block of bits. These QoS parameter fields apply to Service Configuration (SCR), QoS Assignment Message, Forward QoS Assignment Mini Message, and Reverse QoS Assignment Mini Message as shown in the following sections.

MAX_DATA_RATE—Maximum data rate.
The base station shall set this field to the maximum data rate allowed on the Supplemental Channel corresponding to the FOR_SCH_ID or REV_SCH_ID. The value of this field includes 8, 32, 64, 144, 384 kbps.

The following QoS parameters can be included in the SCR for the Forward Channel, Reverse Channel, or both.

QOS_INCL—QoS parameters included indicator.
The base station shall set this field to '1', if the QoS parameters are included in this Service Configuration Record;
otherwise, the base station shall set this field to '0'.
PRIORITY—User priority.
If the QOS_INCL field is set to '0', the base station shall omit this field;
otherwise, the base station shall include this field and set it as follows:
The base station shall set this field to the user priority applicable for user admission and supplemental Burst Allocation.
The value of this field ranges from 1 to 15, with 1 being the highest priority.
MIN_DATA_RATE—Minimum data rate.
If the QOS_INCL field is set to '0', the base station shall omit this field;
otherwise, the base station shall include this field and set it as follows:
The base station shall set this field to the guaranteed minimum data rate provided to the user.
The value of this field includes 8, 32, 64, 144, 384 kbps.
DATA_LOSS_RATE—Data loss rate.
If the QOS_INCL field is set to '0', the base station shall omit this field;
otherwise, the base station shall include this field and set it as follows:
The base station shall set this field to the maximum allowable data loss rate.
The value of this field includes 1%, 2%, 5%, 10%.
MAX_DELAY—Maximum delay.
If the QOS_INCL field is set to '0', the base station shall omit this field;
otherwise, the base station shall include this field and set it as follows:
The base station shall set this field to the maximum amount of time user data can be held in the transmit queue (after which it may be discarded).
The value of this field includes 40, 120, 360 ms, and "no-constraint".

Service Configuration

| Type-Specific Field | Length (bits) |
|---|---|
| FOR_MUX_OPTION | 16 |
| REV_MUX_OPTION | 16 |
| FOR_RATES | 8 |
| REV_RATES | 8 |
| NUM_CON_REC | 8 |
| NUM_CON_REC occurrences of the following five-field record: | |
| RECORD_LEN | 8 |
| CON_REF | 8 |
| SERVICE_OPTION | 16 |
| FOR_TRAFFIC | 4 |
| REV_TRAFFIC | 4 |
| FCH_CC_INCL | 1 |
| FCH_FRAME_SIZE | 0 or 1 |
| FOR_FCH_RC | 0 or 5 |
| REV_FCH_RC | 0 or 5 |
| DCCH_CC_INCL | 1 |
| DCCH_FRAME_SIZE | 0 or 2 |
| FOR_DCCH_RC | 0 or 5 |
| REV_DCCH_RC | 0 or 5 |
| FOR_SCH_CC_INCL | 1 |
| NUN_FOR_SCH | 0 or 2 |
| NUN_FOR_SCH occurrences of the following four-field record | |
| FOR_SCH_ID | 2 |
| FOR_SCH_MUX | 16 |
| SCH_CC_Type-specific field | Variable |
| FOR_MULTI_FRAME_OFFSET | 0 or 2 |
| REV_SCH_CC_INCL | 1 |
| NUM_REV_SCH | 0 or 2 |
| NUM_REV_SCH occurrences of the following | |

-continued

| Type-Specific Field | Length (bits) |
|---|---|
| four-field record | |
| REV_SCH_ID | 2 |
| REV_SCH_MUX | 16 |
| SCH_CC_Type-specific field | Variable |
| REV_MULTI_FRAME_OFFSET | 0 or 2 |
| RLP_INFO_LEN | 3 |
| RLP_BLOB | 8 × RLP_INFO_LEN |
| NUM_FOR_SCH occurrences of the following field | |
| FOR_QOS_BLOB_INCL | 1 |
| FOR_BLOB_LENGTH | 0 or 8 |
| FOR_QOS_BLOB | 0 or 8 × BLOB_LENGTH |
| NUM_REV_SCH occurrences of the following field | |
| REV_QOS_BLOB_INCL | 1 |
| REV_BLOB_LENGTH | 0 or 8 |
| REV_QOS_BLOB | 0 or 8 xx BLOB_LENGTH |
| RESERVED | 0–7 (as needed) |

The following QoS parameters can be included in the SCR for the Forward Channel, Reverse Channel, or both.

QOS_BLOB_INCL—Forward or Reverse QoS BLOB included indicator.
  The base station or mobile station shall set this field to '1', if the forward or reverse QoS BLOB is included in this Service Configuration Record; otherwise, the base station or mobile station shall set this field to '0'.

QOS_BLOB_LENGTH—Forward or Reverse QoS BLOB length.
  The base station or mobile station shall set this field to the number of octets for QoS BLOB, if the forward or reverse QOS_BLOB_INCL is set to '1' in this Service Configuration Record; otherwise, the base station or mobile station shall set this field to '0'.

FOR_QOS_BLOB—Forward QoS BLOB.
  The base station or mobile station shall set this field to include the sub-fields indicated below, if the forward QOS_BLOB_LENGTH is greater than 0 in this Service Configuration Record; otherwise, the base station or mobile station shall set this field to '0'.

| | |
|---|---|
| FOR_MAX_DATA_RATE | 3 |
| FOR_QOS_INCL | 1 |
| FOR_PRIORITY | 0 or 4 |
| FOR_MIN_DATA_RATE | 0 or 3 |
| FOR_DATA_LOSS_RATE | 0 or 3 |
| FOR_MAX_DELAY | 0 or 3 |
| RESERVED | 0 to 7 |

The definition of each sub-field above is shown in section titled "QoS Parameters Fields".

REV_QOS_BLOB—Reverse QoS BLOB.
  The base station or mobile station shall set this field to include the sub-fields indicated below, if the reverse QOS_BLOB_LENGTH is greater than 0 in this Service Configuration Record; otherwise, the base station or mobile station shall set this field to '0'.

| | |
|---|---|
| REV_MAX_DATA_RATE | 3 |
| REV_QOS_INCL | 1 |
| REV_PRIORITY | 0 or 4 |
| REV_MIN_DATA_RATE | 0 or 3 |
| REV_DATA_LOSS_RATE | 0 or 3 |
| REV_MAX_DELAY | 0 or 3 |
| RESERVED | 0 to 7 |

The definition of each sub-field above is shown in section titled "QoS Parameters Fields".

QoS Assignment Message
  MSG_TAG: QAM

| Field | Length (bits) |
|---|---|
| USE_TIME | 1 |
| ACTION_TIME | 6 |
| NUM_FOR_SCH | 0 or 2 |
| NUM_FOR_SCH occurrences of the following four-field record | |
| FOR_SCH_ID | 2 |
| FOR_QOS_BLOB_INCL | 1 |
| FOR_BLOB_LENGTH | 0 or 8 |
| FOR_QOS_BLOB | 0 or 8 × BLOB LENGTH |
| NUM_REV_SCH | 0 or 2 |
| NUM_REV_SCH occurrences of the following four-field record | |
| REV_QOS_BLOB_INCL | 1 |
| REV_BLOB_LENGTH | 0 or 8 |
| REV_QOS_BLOB | 0 or 8 × BLOB_LENGTH |
| RESERVED | 0–7 (as needed) |

USE_TIME—Use action time indicator.
  This field indicates whether an explicit action time is specified in this message.
  If an explicit action time is specified in this message, the base station shall set this field to '1'; otherwise, the base station shall set this field to '0'.

ACTION_TIME—Action time.
  If the USE_TIME field is set to '1', the base station shall set this field to the System Time, in units of 80 ms (modulo 64), at which this message is to take effect. If the USE_TIME field is set to '0' the base station shall omit this field.

PRIORITY—User priority.
  The base station shall set this field to the user priority applicable for user admission and supplemental Burst Allocation.
  The value of this field ranges from 1 to 15, with 1 being the highest priority.

The definitions for QoS related fields (FOR_QOS_BLOB_INCL, FOR_BLOB_LENGTH, FOR_QOS_BLOB, REV_QOS_BLOB_INCL, REV_BLOB_LENGTH, and REV_QOS_BLOB) are the same as in section titled "Service Configuration (SCR)".

Forward QoS Assignment Mini Message
  MSG_TAG: FQAMM

| FIELD | LENGTH (BITS) |
|---|---|
| FOR_SCH_ID | 2 |
| FOR_PRIORITY | 4 |
| FOR_MIN_DATA_RATE | 3 |
| FOR_DATA_LOSS RATE | 3 |

-continued

| FIELD | LENGTH (BITS) |
|---|---|
| FOR_MAX DELAY | 3 |
| RESERVED | 1 |

REVERSE QOS ASSIGNMENT MINI MESSAGE
MSG_TAG: RQAMM

| FIELD | LENGTH (BITS) |
|---|---|
| REV_SCR_ID | 2 |
| REV_PRIORITY | 4 |
| REV_MIN_DATA_RATE | 3 |
| REV_DATA_LOSS RATE | 3 |
| REV_MAX_DELAY | 3 |
| RESERVED | 1 |

Numerous modifications and variations of the present invention are possible in light of the above teachings. It is therefore to be understood that within the scope of the appended claims, the invention may be practised otherwise than as specifically described herein.

We claim:

1. A method of extending RSVP QoS signaling to a wireless network comprising:

intercepting a PATH message to or from a mobile terminal served by the wireless network, modifying its contents to reflect constraints of the wireless network and forwarding the PATH message;

intercepting a RESV message received in response to the PATH message; and after intercepting the RESV message, in sequence:

performing a QoS mapping from a RSVP QoS specified in the RESV message to wireless network parameters;

checking if an existing wireless traffic channel satisfies the wireless network parameters and if not coordinating the establishment of a wireless traffic channel which satisfies the wireless network parameters; and forwarding the RESV message if a wireless traffic channel could be established and generating an RESVerr message if a wireless traffic channel could not be established.

2. An article of manufacture comprising:

a computer usable medium having computer readable program code means embodied therein for allowing RSVP signaling to be extended to a radio network, the computer readable code means in said article of manufacture comprising:

computer readable code means for implementing a method according to claim 1.

3. A method according to claim 1 wherein coordinating the establishment of a wireless traffic channel comprises checking if resources are available to satisfy the wireless network parameters, and proceeding with setting up the wireless channel if resources are available, and if not sending the RESVerr message to whatever entity previously forwarded the RESV message.

4. A method according to claim 1 further comprising:

intercepting a PATHTEAR message or RESVTEAR message relating to a particular RSVP session and releasing any radio resource assigned to the particular RSVP session and forwarding the message.

5. A method according to claim 1 applied to a mobile terminal terminated request wherein the PATH message is forwarded to the mobile terminal through a Data Burst message specifically defined for this purpose.

6. A method according to claim 1 further comprising updating a slack term S and a bandwidth reservation R in the RESV message to reflect the wireless network before forwarding the RESV message.

7. A method according to claim 1 applied to a mobile terminal originated request wherein the PATH message is sent by the mobile terminal through a Data Burst message specifically defined for this purpose.

8. A method according to claim 1 applied to a mobile originated request wherein the PATH message is generated by an application running on the mobile terminal and sent on a traffic channel.

9. A method according to claim 8 further comprising establishing the traffic channel if one is not already in existence.

10. A method according to claim 1 applied to a mobile terminal terminated request wherein the PATH message is forwarded to the mobile terminal through a Short Data Burst service.

11. A method according to claim 1 applied to a mobile terminal terminated request wherein the PATH message is forwarded to the mobile terminal on a traffic channel.

12. A method according to claim 11 further comprising establishing the traffic channel if one is not already in existence.

13. A method according to claim 1 applied to a mobile terminal originated request wherein the PATH message is sent by the mobile terminal through a Short Data Burst service.

14. A method according to claim 1 further comprising the mobile terminal transiting through MAC states during periods of inactivity.

15. A method according to claim 14 wherein the mobile terminal transits from Active to Control Hold, from Control Hold to Suspended, from Suspended to Dormant after a respective period of inactivity in each state.

16. A method according to claim 15 further comprising:

maintaining a cleanup timer for each of PATH state and RESV state each of which will expire after not being refreshed for predetermined periods of time; and managing MAC state transitions on the basis of the expiry of the cleanup timers.

17. A method according to claim 16 wherein the RSVP QoS is specified in terms of a reserved bandwidth R and a slack term S, the method further comprising:

while in the Active state and if a timeout has occurred, determining from the slack term if there is sufficient slack to compensate for a delay which would occur in transiting from Control Hold to Active MAC states, and if not, not timing out from the Active state until the cleanup timer for the path or reservation state expires.

18. A method according to claim 15 further comprising:

maintaining respective timers for each of the MAC states of Active, Control Hold, and Suspended which control the MAC state transitions.

19. A method of extending a wire line QoS signaling schema featuring QoS messages to a wireless network comprising:

intercepting all QoS messages addressed to or received from a mobile terminal served by the wireless network, at least one of the QoS messages specifying a wire line QoS in accordance with the wire line QoS signaling schema;

modifying contents of the QoS messages to reflect constraints of the wireless network;

forwarding the QoS messages thus modified subject to the constraint that any message confirming the establishment of a connection between the mobile terminal and the wireless network is not forwarded until after:

performing a QoS mapping from a wire line QoS specified in the messages to wireless network parameters;

checking if an existing wireless traffic channel satisfies the wireless network parameters and if not coordinating the establishment of a wireless traffic channel which satisfies the wireless network parameters.

20. A base station comprising:

an RSVP daemon for intercepting RSVP messages;

a QoS signaling adaptation module adapted to:
  map RSVP QoS to wireless parameters;
  modify RSVP messages to reflect wireless constraints;
  release RSVP messages to be forwarded after they have been modified subject to the constraint that any message confirming a connection to a mobile terminal having a particular RSVP QoS is not sent until a wireless connection having wireless parameters sufficient to at least meet the RSVP QoS has been established or verified to exist; and a QoS signaling adaptation control module for requesting a wireless connection based on the wireless parameters.

21. A network functional element for extending RSVP QoS signaling comprising:

an RSVP QoS signaling adaptation functional element adapted to intercept RSVP messages and modify their contents to reflect the presence of the wireless network before forwarding them on; and an RSVP QoS signaling control functional element adapted to coordinate the establishment of a traffic channel to a mobile terminal as a function of a MAC state of the mobile terminal.

22. A network functional element according to claim 21 further comprising a cleanup timer for each of PATH state and RESV state each of which will expire after not being refreshed for predetermined periods of time;

after the expiry of either of the cleanup timers performing a state transition.

23. A network functional element according to claim 21 further comprising a respective timer for each of the MAC states of Active, Control Hold, and Suspended which control the MAC state transitions.

24. A network functional element according to claim 21 wherein said RSVP messages comprise PATH and RESV messages.

25. A network finctional element according to claim 24 further comprising a resource control entity which establishes and maintains traffic channels to mobile terminals, wherein said RSVP QoS signaling control fimctional element interacts with the resource control entity to determine if resources are available to satisfy the wireless network parameters, and proceeds with setting up the wireless channel if resources are available, and if not sending a RESVerr message to whatever entity previously forwarded a RESV message of the RESV messages.

26. A network functional element according to claim 24 wherein the QoS parameters comprise a slack term S and a bandwidth reservation R in the RESV messages.

* * * * *

UNITED STATES PATENT AND TRADEMARK OFFICE
CERTIFICATE OF CORRECTION

PATENT NO. : 6,728,365 B1
DATED : April 27, 2004
INVENTOR(S) : Xiao-Dong Li et al.

It is certified that error appears in the above-identified patent and that said Letters Patent is hereby corrected as shown below:

Column 20,
Service Configuration Table, lines 23 and 24, "NUN..." should be -- NUM... --.

Column 21,
Service Configuration Table, line 3, include the following:

| FOR_SCH_ID | 2 |
|---|---|
| FOR_SCH_MUX | 16 |
| SCH_CC_Type-specific field | Variable |
| FOR_MULTI_FRAME_OFFSET | 0 or 2 |
| REV_SCH_CC_INCL | 1 |
| NUM_REV_SCH | 0 or 2 |

NUM_REV_SCH occurrences of the following four-field record

Service Configuration Table, line 20, "0 or 8 xx" should be -- 0 or 8 x --.

Column 22,
Line 21, "0 or 8 x BLOB LENGTH" should be -- 0 or 8 x BLOB_LENGTH --.

Column 26,
Line 4, the word "fimctional" should be -- functional --.

Signed and Sealed this

Ninth Day of November, 2004

JON W. DUDAS
*Director of the United States Patent and Trademark Office*